US012803932B2

(12) United States Patent
Li et al.

(10) Patent No.: US 12,803,932 B2
(45) Date of Patent: Nov. 17, 2026

(54) METHOD AND SCHEDULING MANAGEMENT UNIT FOR TRANSMITTING DATA PACKET

(71) Applicant: Alibaba (China) Co., Ltd., Hangzhou (CN)

(72) Inventors: Yunfang Li, Shanghai (CN); Jiayi Huang, Beijing (CN); Lide Duan, Sunnyvale, CA (US); Dimin Niu, Sunnyvale, CA (US)

(73) Assignee: Alibaba (China) Co., Ltd., Hangzhou (CN)

( * ) Notice: Subject to any disclaimer, the term of this patent is extended or adjusted under 35 U.S.C. 154(b) by 306 days.

(21) Appl. No.: 18/413,555

(22) Filed: Jan. 16, 2024

(65) Prior Publication Data

US 2024/0244013 A1 Jul. 18, 2024

(30) Foreign Application Priority Data

Jan. 17, 2023 (CN) ......................... 202310117599.6

(51) Int. Cl.
*H04L 49/109* (2022.01)
*H04L 49/90* (2022.01)

(52) U.S. Cl.
CPC ............ *H04L 49/109* (2013.01); *H04L 49/90* (2013.01)

(58) Field of Classification Search
None
See application file for complete search history.

(56) References Cited

U.S. PATENT DOCUMENTS 5,592,610 A * 1/1997 Chittor .................. H04L 49/557 714/E11.011
8,667,439 B1 * 3/2014 Kumar ................ G06F 30/3312 716/108
9,529,400 B1 * 12/2016 Kumar .................. G06F 1/3243
(Continued)

FOREIGN PATENT DOCUMENTS

CN 103973482 A * 8/2014
CN 111475457 A 7/2020
(Continued)

OTHER PUBLICATIONS

Office Action issued in corresponding Chinese Application No. 202310117599.6 on Jul. 29, 2025, (11 pages).
(Continued)

*Primary Examiner* — Christopher T Wyllie
(74) *Attorney, Agent, or Firm* — Finnegan, Henderson, Farabow, Garrett & Dunner, LLP

(57) ABSTRACT

Embodiments of this disclosure provide a data packet transmission method, a scheduling management unit, a chip, and a graphic card. The data packet transmission method includes: determining a source node and a destination node of a data packet to be transmitted; determining at least one intermediate routing node corresponding to the data packet to be transmitted based on the source node and the destination node of the data packet to be transmitted and a data transmission state of each node in a network on chip (NoC); and transmitting identification information of the at least one intermediate routing node to the source node of the data packet to be transmitted.

18 Claims, 8 Drawing Sheets

(56) References Cited

U.S. PATENT DOCUMENTS

2005/0271054 A1* 12/2005 Kang ...................... H04L 47/24
370/389
2013/0051397 A1* 2/2013 Guo ........................ H04L 45/00
370/400
2013/0148506 A1* 6/2013 Lea ....................... H04L 49/101
370/352
2014/0115298 A1* 4/2014 Philip ................... G06F 30/394
712/29
2014/0344501 A1* 11/2014 Kommanaboina ..........................
G06F 13/4022
710/305
2015/0358211 A1* 12/2015 Kumar ................ H04L 41/0806
370/254
2017/0293586 A1* 10/2017 Yan ..................... G06F 13/4221
2017/0293587 A1* 10/2017 Yan ..................... G06F 13/4045
2018/0203963 A1* 7/2018 Eghbal .................. G06F 11/261
2018/0324110 A1* 11/2018 Ge ...................... H04L 49/9005
2020/0401402 A1* 12/2020 Capalija .................. G06F 8/427
2024/0244013 A1* 7/2024 Li ......................... H04L 49/109

FOREIGN PATENT DOCUMENTS

CN 113489654 A 10/2021
WO 2022143020 A1 7/2022

OTHER PUBLICATIONS

Qian et al., "A Support Vector Regression (SVR)-Based Latency Model for Network-on-Chip (NoC) Architectures," IEEE Transactions on Computer-Aided Design of Integrated Circuits and Systems, vol. 35 No. 3, 2016, pp. 471-484.

* cited by examiner

300

600

METHOD AND SCHEDULING MANAGEMENT UNIT FOR TRANSMITTING DATA PACKET

CROSS-REFERENCE TO RELATED APPLICATIONS

The disclosure claims the benefits of priority to Chinese Application No. 202310117599.6, filed on Jan. 17, 2023, which is incorporated herein by reference in its entirety.

TECHNICAL FIELD

Embodiments of this disclosure relate to the field of chip technologies, and in particular, to a data packet transmission method, a scheduling management unit, a chip, and a graphic card.

BACKGROUND

A network on chip (NoC) connects a plurality of nodes on the chip together, so that the nodes can communicate reliably. The nodes include a process element (also referred to as processing element, simplified as PE) and a router, and the PE includes hardware resources such as a processor, a dynamic random access memory (DRAM), a private cache, and a network interface. A topology of the NoC can include a mesh network, a torus network, a ring network, and the like. The nodes communicate with each other through transmission of a data packet. After departing from a source node, the data packet is transmitted node by node, until it arrives at a destination node.

At present, a node transmits a data packet through the NoC based on an XY routing algorithm. After the data packet is sent from the source node, the data packet is first transmitted to a node in a same column as the destination node in an X-dimension direction, and then transmitted to the destination node in a Y-dimension direction.

However, in the NoC, the data packet is transmitted between connected nodes in the form of a data stream. If a plurality of data packets needs to be transmitted from one node to another connected node, the data packets need to be transmitted in sequence, which leads to a problem of data congestion and low transmission efficiency of data packets.

SUMMARY

The disclosed embodiments of this disclosure provide a data packet transmission method, a scheduling management unit, a chip, and a graphic card, to at least resolve or alleviate the above problem.

According to some embodiments of this disclosure, there is provided a data packet transmission method applied to a scheduling management unit. The method includes: determining a source node and a destination node of a data packet to be transmitted; determining at least one intermediate routing node corresponding to the data packet to be transmitted based on the source node and the destination node of the data packet to be transmitted and a data transmission state of each node in a network on chip (NoC); and transmitting identification information of the at least one intermediate routing node to the source node of the data packet to be transmitted, so that the source node of the data packet to be transmitted writes the identification information of the at least one intermediate routing node to a head flit of the data packet to be transmitted, to enable the data packet to be transmitted to be transmitted to the at least one intermediate routing node in sequence based on an XY routing algorithm and then reach the destination node of the data packet to be transmitted.

According to some embodiments of this disclosure, there is provided a data packet transmission method applied to a node of an NoC. The method includes: obtaining a head flit of a data packet to be transmitted, wherein the head flit stores identification information of at least one intermediate routing node, and the at least one intermediate routing node is determined based on a source node and a destination node of the data packet to be transmitted and a data transmission state of each node of an NoC; and transmitting, based on the identification information of each intermediate routing node stored in the head flit, the data packet to be transmitted to the at least one intermediate routing node based on an XY routing algorithm, so that the data packet to be transmitted passes through the at least one intermediate routing node in sequence and then reaches the destination node.

According to some embodiments of this disclosure, a scheduling management unit is provided, including: a reading subunit including circuitry configured to determine a source node and a destination node of a data packet to be transmitted; a planning subunit including circuitry configured to determine at least one intermediate routing node corresponding to the data packet to be transmitted based on the source node and the destination node of the data packet to be transmitted and a data transmission state of each node of an NoC; and an output subunit including circuitry configured to transmit identification information of the at least one intermediate routing node to the source node of the data packet to be transmitted, so that the source node of the data packet to be transmitted writes the identification information of the at least one intermediate routing node to a head flit of the data packet to be transmitted, to enable the data packet to be transmitted to be transmitted to the at least one intermediate routing node in sequence based on an XY routing algorithm and then reach the destination node of the data packet to be transmitted.

According to some embodiments of this disclosure, a node of an NoC is provided, including: an obtaining subunit including circuitry configured to obtain a head flit of a data packet to be transmitted, wherein the head flit stores identification information of at least one intermediate routing node, and the at least one intermediate routing node is determined based on a source node and a destination node of the data packet to be transmitted and a data transmission state of each node of the NoC; and a transmission subunit including circuitry configured to transmit, based on the identification information of each intermediate routing node stored in the head flit, the data packet to be transmitted to the intermediate routing node based on an XY routing algorithm, so that the data packet to be transmitted passes through the at least one intermediate routing node in sequence and then reaches the destination node.

According to some embodiments of this disclosure, there is provided a chip including the scheduling management unit described above and a plurality of nodes of an NoC described above.

According to some embodiments of this disclosure, there is provided a graphic card including the chip described above.

BRIEF DESCRIPTION OF THE DRAWINGS

The accompanying drawings described herein are used for providing a further understanding of the present disclosure, and forming a part of the present disclosure. Exemplary examples of the present disclosure and descriptions thereof are used for explaining the present disclosure, but do not constitute any inappropriate limitation to the present disclosure. In the accompanying drawings.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms or definitions incorporated by reference.

In the disclosed embodiments, the transmission of data packets involves determining at least one intermediate routing node based on the source and destination nodes of the packet, as well as the transmission state of each node in the NoC. After the identification information of the intermediate nodes is sent to the source node, it is stored in the head flit of the data packet, enabling the NoC node to transmit the packet in sequence to the intermediate nodes using the XY routing algorithm before ultimately reaching the destination node. This process ensures that the intermediate nodes selected for transmission are free from data traffic congestion, resulting in quicker delivery of the data packet to the destination node and increased efficiency of the overall transmission.

Figure 1:
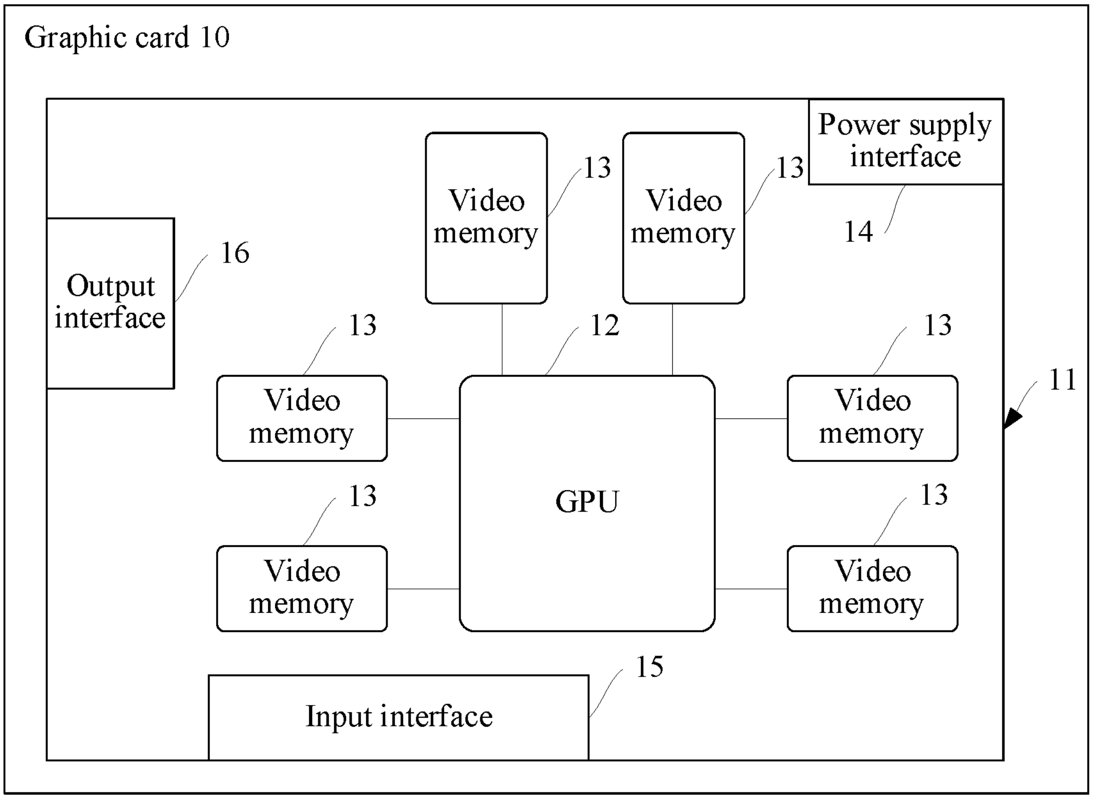
FIG. 1 is a schematic diagram of an exemplary graphic card according to some embodiments of this disclosure.

FIG. 1 is a schematic diagram of an exemplary graphic card 100 according to some embodiments of this disclosure. A graphic card is one of basic components of a computer, which converts display information required by a computer system to drive a display, provides progressive or interlaced scanning signals to the display, and controls correct display of the display. The graphic card is an important component connecting the display to a computer motherboard, and the built-in parallel computing capability of the graphic card is also used for operations such as deep learning.

The graphic card includes an integrated graphic card, a discrete graphic card, and a core graphic card. The integrated graphic card can be integrated in a Northbridge chip of a motherboard and shares a system memory or has its own memory. As a specialized hardware device for image processing and parallel computing, the discrete graphic card is a board card independent of a computer motherboard and inclusive of a display chip and related devices. The core graphic card is integrated in a CPU and shares system memory resources.

The discrete graphic card is used as an example. As shown in FIG. 1, graphic card 10 may include a printed circuit board (PCB) 11, a graphics processing unit (GPU) 12, a video memory 13, a power supply interface 14, an input interface 15, and an output interface 16.

PCB 11 provides mechanical support for GPU 12, video memory 13, power supply interface 14, input interface 15, and output interface 16, and an electrical connection between the components. PCB 11 is provided with capacitors, inductors, controllers, and the like.

GPU 12 is also referred to as a display core, a display chip, and the like. GPU 12 is the core of the graphic card, which is configured to process image and graphics related calculation, and is further configured for operations such as deep learning. GPU 12 includes an arithmetic unit, a control unit, a cache unit, and the like.

In some embodiments, a plurality of video memories 13 may be arranged and configured to cache rendering data processed or to be extracted by GPU 12.

Power supply interface 14 is connected to GPU 12 and the video memory 13 through wires on PCB 11 to supply power to GPU 12 and the video memory 13.

Input interface 15 is connected to the motherboard to implement data transmission between the CPU and GPU 12. In some embodiments, input interface 15 may be a PCI-E interface.

Output interface 16 is configured to connect to a display, and output interface 16 includes one or more of VGA, DVI, HDMI, DP, SUB-C, and the like.

As described below, some embodiments of this disclosure mainly focuses on flow control inside GPU 12.

Figure 2:
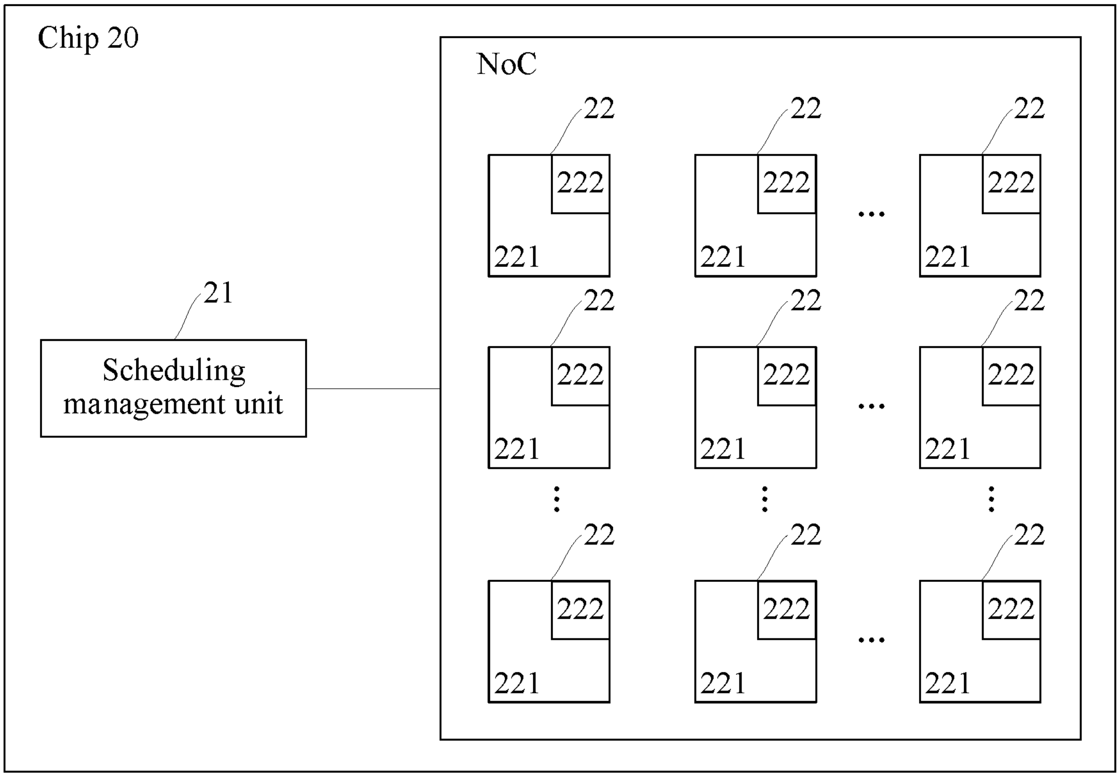
FIG. 2 is a schematic diagram of an exemplary chip according to some embodiments of this disclosure.

FIG. 2 is a schematic diagram of an exemplary chip 20 according to some embodiments of this disclosure. Chip 20 may be GPU 12 in some embodiments described above. To be specific, chip 20 is a GPU, but the embodiments of this disclosure are not limited thereto. Chip 20 may be any chip that satisfies the following structure and functions. For example, chip 20 may be a CPU, a neural processing unit (NPU), or an infrastructure processing unit (IPU).

As shown in FIG. 2, chip 20 includes a scheduling management unit 21 and a plurality of nodes 22. The plurality of nodes 22 form a Network on chip (NoC), and a topology of the NoC may be a 2D/3D mesh network, torus network, ring network, and the like. Nodes 22 include a PE 221 and a router 222. PE 221 may be a hardware resource such as a processor, a DRAM, a private cache, or a network interface. In some embodiments, when chip 20 is a GPU, PE 221 in node 22 may be a stream processor.

The NoC is a new communication method of a system on chip (SoC). The NoC connects a plurality of nodes on a chip together, so that the nodes can communicate reliably. A topology, which includes the nodes included in the NoC, can be a 2D/3D mesh network, torus network, ring network, and the like.

The nodes are elements that constitute an NoC, which are also referred to as tiles. The nodes include a process element (also referred to as processing element, simplified as PE) and a router. Connected nodes communicate through transmission of a data packet, and the data packet is transmitted from a router included in one node to a router included in another node. The PE included in a node of a graphics processing unit (GPU) is a stream processor.

Scheduling management unit 21 is configured to perform scheduling management on nodes 22 and control transfer of a data packet among nodes 22.

During transmission of the data packet among nodes 22, if a source node and a destination node are directly connected in the NoC, the source node sends the data packet to a router of the destination node through a router of the source node. If the source node and the destination node are not directly connected in the NoC, the source node sends the data packet to an intermediate node through the router of the source node, and transmits the data packet to the destination node through forwarding of one or more intermediate nodes.

In the present disclosure, a source node is a node that sends a data packet in the NoC is the source node.

A destination node is a node that the data packet needs to reach in the NoC is the destination node, and the destination node may be directly connected to the source node, or may be indirectly connected to the source node through one or more intermediate nodes. When the destination node is directly connected to the source node, the source node directly sends the data packet to the destination node. When the destination node is connected to the source node through the intermediate node, the source node sends the data packet to the intermediate node, and one or more intermediate nodes forward the data packet to the destination node.

Because the data packet is transmitted among the connected nodes 22 of the NoC in the form of a data stream, if a plurality of data packets needs to be transmitted from one node 22 to another node 22, the data packets need to queue for transmission, which may cause a problem of communication congestion of the NoC and leads to low transmission efficiency of the data packets.

Some embodiments of this disclosure provide a data packet transmission solution, which is used to at least resolve or alleviate the problem of low transmission efficiency of data packets. The data packet transmission solution provided in some embodiments of this disclosure is also described in detail below respectively in terms of scheduling management unit 21 and node 22.

Based on the above-described chip, some embodiments of this disclosure provide a data packet transmission method. The data packet transmission method may be performed by scheduling management unit 21 in some of the embodiments described above and is described in detail below.

Figure 3:
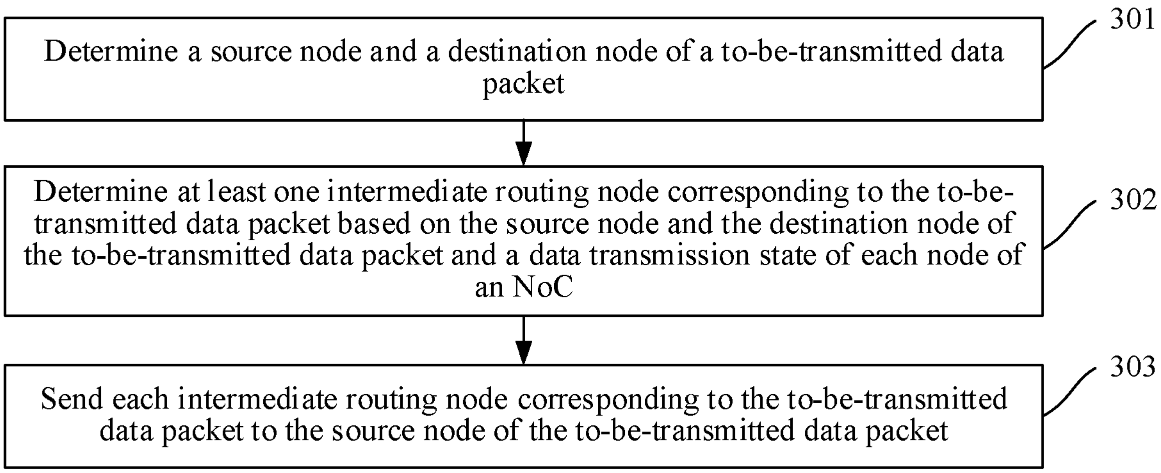
FIG. 3 is a flowchart of an exemplary data packet transmission method according to some embodiments of this disclosure.

FIG. 3 is a flowchart of an exemplary data packet transmission method 300 according to some embodiments of this disclosure. As shown in FIG. 3, data packet transmission method 300 includes the following steps 301 to 303, which can be implemented by a scheduling management unit (e.g., scheduling management unit 21 as shown in FIG. 2).

In step 301, the scheduling management unit determines a source node and a destination node of a data packet to be transmitted.

When a data packet to be transmitted needs to be transmitted from one node to another node of an NoC, the source node and the destination node of the data packet to be transmitted need to be determined first. The source node is a node that sends the data packet to be transmitted, and the destination node is a node that the data packet to be transmitted needs to reach.

It is to be noted that when a node of the NoC sends a data packet to another node, the node usually sends a plurality of data packets instead of sending only one data packet. For example, a message is split into a plurality of data packets, and the data packets need to be transmitted from one node to another node. In this case, the data packets correspond to a same source node and a same destination node. Therefore, in some embodiments, the source node and the destination node do not need to be separately determined for a single data packet that needs to be transmitted in the NoC, but a unified source node and destination node may be determined for a batch or a plurality of data packets in a specific period of time.

In step 302, the scheduling management unit determines at least one intermediate routing node corresponding to the data packet to be transmitted based on the source node and the destination node of the data packet to be transmitted and a data transmission state of each node of an NoC.

After the source node and the destination node of the data packet to be transmitted are determined, the at least one intermediate routing node corresponding to the data packet to be transmitted is determined based on the source node and the destination node of the data packet to be transmitted and the data transmission state of each node of the NoC. The intermediate routing node is a node that the data packet to be transmitted needs to pass through during the transmission from the source node to the destination node. One or more intermediate routing nodes may be provided. When one intermediate routing node is provided, the intermediate routing node is the destination node of the data packet to be transmitted. When a plurality of intermediate routing nodes are provided, other than one intermediate routing node that is the destination node of the data packet to be transmitted, the remaining intermediate routing nodes are the nodes that the data packet to be transmitted needs to pass through after being sent from the source node before reaching the destination node.

Each intermediate routing node corresponding to the data packet to be transmitted is determined based on the data transmission state of each node of the NoC. To be specific, in determining the intermediate routing node corresponding to the data packet to be transmitted based on the source node and the destination node of the data packet to be transmitted, the intermediate routing node needs to be determined based on the data transmission state of each node of the NoC. The data transmission state of each node of the NoC may be a current data transmission state of each node of the NoC, or may be a historical data transmission state of each node of the NoC. For example, a data transmission state of each node of the NoC is periodically obtained, and an intermediate routing node corresponding to the data packet to be transmitted is determined based on the data transmission state of each node of the NoC obtained last time.

The data transmission state of each node of the NoC may indicate a data traffic situation of each node of the NoC, so that the node with traffic congestion may be determined based on the data transmission state of each node. Then when the intermediate routing node of the data packet to be transmitted is determined, a transmission path of the data packet to be transmitted is determined through the intermediate routing node, so that the transmission path of the data packet to be transmitted bypasses these nodes with traffic congestion, the time for the data packet to be transmitted from the source node to the destination node is hence shortened, and the efficiency of data packet transmission is improved.

In step 303, the scheduling management unit sends each intermediate routing node corresponding to the data packet to be transmitted to the source node of the data packet to be transmitted.

After each intermediate routing node corresponding to the data packet to be transmitted is determined, each intermediate routing node corresponding to the data packet to be transmitted is sent to the source node of the data packet to be transmitted. The source node of the data packet to be transmitted stores identification information of each intermediate routing node in a head flit of the data packet to be transmitted. Then, during transmission of the data packet to be transmitted from the source node thereof to the destination node, a relevant node transmits the data packet to be transmitted to the intermediate routing nodes in sequence based on an XY routing algorithm according to the identification information of the intermediate routing node stored in the head flit of the data packet to be transmitted, thereby implementing the transmission of the data packet to be transmitted from the source node to the destination node.

When a message is injected into the NoC, the message is divided into one or more data packets, then the data packets are divided into flits with a fixed length, and the flits are flow control units. The flit includes a head flit, a body flit, and a tail flit. The head flit stores identification information of a source node and a destination node of the data packet, the body flit stores specific data of the data packet, and the tail flit indicates an end of the data packet.

In some embodiments of the present disclosure, the XY routing algorithm can be implemented for transmitting data packets. During transmission of a data packet from a source node to a destination node, if the data packet needs to be routed in an X dimension, the data packet is to be routed in the X dimension until a current node and the destination node are in a same column, and then routed in a Y dimension to reach the destination node.

During storage of the identification information of the intermediate routing node into the head flit of the data packet to be transmitted, the identification information of each intermediate routing node needs to be stored into the head flit of the data packet to be transmitted in sequence based on a sequence in which the data packet to be transmitted passes through each intermediate routing node. Then, the node may determine, based on a sequence of the identification information of each intermediate routing node in the head flit after receiving the head flit of the data packet to be transmitted, an intermediate routing node to which the data packet to be transmitted is to be transmitted based on the XY routing algorithm.

For example, it is determined that a data packet to be transmitted corresponds to an intermediate routing node 1 and an intermediate routing node 2. The intermediate routing node 2 is a destination node of the data packet to be transmitted. During transmission of the data packet to be transmitted from a source node to the destination node, the data packet to be transmitted is first transmitted from the source node to the intermediate routing node 1 based on the XY routing algorithm. Then, the data packet is transmitted from the intermediate routing node 1 to the destination node based on the XY routing algorithm. Identification information of the source node, the identification information of the intermediate routing node 1, and the identification information of the intermediate routing node 2 are stored in sequence into the head flit of the data packet to be transmitted. The source node and each node located between the source node and the intermediate routing node 1 determined based on the XY routing algorithm transmit the data packet to be transmitted to the intermediate routing node 1 based on the XY routing algorithm, according to the identification information stored in the head flit. The intermediate routing node 1 and each node between the intermediate routing node 1 and the intermediate routing node 2 determined based on the XY routing algorithm transmit the data packet to be transmitted to the intermediate routing node 2 based on the XY routing algorithm, according to the identification information stored in the head flit.

During transmission of the data packet to be transmitted, the NoC may generate a plurality of flits for the data packet to be transmitted, including a head flit, at least one body flit, and a tail flit. The head flit stores the identification information of the source node and each intermediate routing node of the data packet to be transmitted, data in the data packet to be transmitted is split and stored into each body flit, and the tail flit indicates the end of the transmission of the data packet to be transmitted. The head flit, the body flit, and the tail flit have the same data capacity. For example, the data capacity of the head flit, the body flit, and the tail flit are all 64 bytes, and a data volume of data stored in the head flit is much less than the data volume of data stored in the body flit. Therefore, the identification information of a plurality of intermediate routing nodes may be stored in the head flit without adjusting a storage structure of the head flit.

When a data packet is transmitted between connected nodes of the NoC, a head flit of the data packet is first transmitted, then each body flit is transmitted, the tail flit is transmitted after the transmission of each body flit, and the identification information of the intermediate routing node corresponding to the data packet is stored into the head flit. Therefore, after a node receives the head flit of the data packet, a node to which the data packet is to be transmitted may be determined.

In some embodiments of this disclosure, at least one intermediate routing node corresponding to the data packet to be transmitted is determined based on the source node and the destination node of the data packet to be transmitted and the data transmission state of each node of the NoC. After the identification information of each intermediate routing node is sent to the source node of the data packet to be transmitted, the source node stores the identification information of each intermediate routing node into the head flit of the data packet to be transmitted, so that the node of the NoC may transmit the data packet to be transmitted to the intermediate routing nodes in sequence based on the XY routing algorithm, and then transmit the data packet to be transmitted to the destination node. Because the intermediate routing node is determined based on the data transmission state of each node of the NoC, the intermediate routing node, as a node through which the data packet to be transmitted passes, may determine a proper transmission path of the data packet to be transmitted, which avoids the node with data traffic congestion, and shortens a time for transmitting the data packet to be transmitted to the destination node, thereby improving efficiency of transmitting the data packet.

The process of transmitting data packet to be transmitted from the source node to the intermediate routing node and from one intermediate routing stage to another intermediate routing node is performed based on the XY routing algorithm, which can avoid a deadlock during the transmission of the data packet to be transmitted.

In some embodiments, during the determining of the intermediate routing node corresponding to the data packet to be transmitted, it may be detected whether an intermediate routing table stores at least one available routing entry. A source node corresponding to the available routing entry is the source node of the data packet to be transmitted, and a destination node corresponding to the available routing entry is the destination node of the data packet to be transmitted. The available routing entry includes at least one intermediate routing node, and the available routing entry is determined based on the data transmission state of each node of the NoC. If the intermediate routing table stores the available routing entry, each intermediate routing node included in an available routing entry corresponding to a latest updating time is determined as the intermediate routing node corresponding to the data packet to be transmitted.

The intermediate routing table may store one or more routing entries. The routing entry stored in the intermediate routing table is created for a historical data packet to be transmitted, and the routing entry records a transmission path of the historical data packet to be transmitted. The routing entry records the corresponding source node and at least one intermediate routing node, where one intermediate routing node is a corresponding destination node. Therefore, the routing entry records a data transmission path from the source node to the destination node. Different routing entries may correspond to the same source node or different source nodes, and different routing entries may correspond to the same destination node or different destination nodes. Therefore, different routing entries may correspond to the same source node and the same destination node.

The following Table 1 is an intermediate routing table according to some embodiments of this disclosure, which records three routing entries. Each of the routing entries records a source node SRC and two intermediate routing nodes IRP1 and IRP2, and the intermediate routing node IRP2 is the destination node. Numbers 0, 2, 3, 4, 6, and 8 in Table 1 are identifiers of corresponding nodes.

TABLE 1

| SRC | IRP1 | IRP2 |
|---|---|---|
| 0 | 2 | 2 |
| 0 | 4 | 8 |
| 3 | 6 | 8 |

In Table 1 above, the intermediate routing node IRP1 and the intermediate routing node IRP2 included in a first routing entry are the same, and therefore the first routing entry records a data transmission path from a source node 0 to a destination node 2 based on the XY routing algorithm. A second routing entry records a data transmission path from the source node 0 to a destination node 8 via an intermediate routing node 4. A third routing entry records a data transmission path from the source node 3 to the destination node 8 via an intermediate routing node 6.

For the routing entry recorded in the intermediate routing table, the routing entry is determined based on the data transmission state of each node of the NoC at that time. The routing entry in the intermediate routing table may be created for a data packet transmission task. In the data packet transmission task, one or more data packets need to be transmitted from the corresponding source node to the destination node. After the routing entry is created for the data packet transmission task, the data packet included in the data packet transmission task is transmitted from the source node to the destination node in sequence based on the routing entry, and the routing entry in the intermediate routing table is deleted or recycled after the data packet included in the data packet transmission task is transmitted to the destination node.

A plurality of routing entries that correspond to the same source node and the same destination node may be provided in the intermediate routing table, and therefore the intermediate routing table may be searched for a plurality of available routing entries. If an available routing entry is found in the intermediate routing table, then each intermediate routing node included in the available routing entry is determined as the intermediate routing node corresponding to the data packet to be transmitted. If a plurality of available routing entries is found in the intermediate routing table, then each intermediate routing node included in an available routing entry corresponding to a latest updating time is determined as the intermediate routing node corresponding to the data packet to be transmitted.

For the available routing entry corresponding to the latest updating time, the data transmission state of each node of the NoC is close to a data transmission state of each node of the NoC at a current time when the available routing entry is determined. Therefore, the available routing entry corresponding to the latest updating time is adopted to transmit the data packet to be transmitted, so that the transmission path of the data packet to be transmitted better matches the data transmission state of each node of the NoC at the current time, and the time required for transmitting data packet to be transmitted is shortened.

It is to be understood that the routing entry described in some embodiments of this disclosure includes the intermediate routing node, which means that the routing entry records the identification information of the intermediate routing node.

In some embodiments of this disclosure, the intermediate routing table stores a routing entry generated for the historical data packet to be transmitted, and the routing entry defines the transmission path of the data packet. Because the transmission time of the data packet in the NoC is relatively short, and the data transmission state of each node of the NoC does not fluctuate greatly in a short time, the intermediate routing table may be searched for a corresponding available routing entry having the source node and the destination node that are the same as those of the data packet to be transmitted, and then each intermediate routing node included in the available routing entry may be determined as the intermediate routing node of the data packet to be transmitted. That is, the data packet to be transmitted is transmitted based on the transmission path defined by an available routing entry, and the intermediate routing node does not need to be re-determined based on the data transmission state of each node of the NoC for each data packet to be transmitted, which saves the time of analyzing the data transmission state for some data packets to be transmitted and may further improve the transmission efficiency of data packets.

The intermediate routing table has three registers, which are respectively a selection register, a result register, and a mode register. After the source node and the destination node of the data packet to be transmitted are determined, a binary number 01 is written to the mode register to instruct the intermediate routing table to enter a search mode, and then the identification information of the source node and the destination node of the data packet to be transmitted is written to the selection register to indicate an entry content to be searched. In the search mode of the intermediate routing table, the identification information of the source node of the data packet to be transmitted is first read from the selection register, and the stored routing entries are searched for a corresponding routing entry having the source node that is the same as the source node of the data packet to be transmitted. Then, the identification information of the destination node of the data packet to be transmitted is read from the selection register, and the corresponding routing entry having the source node that is the same as the source node of the data packet to be transmitted is searched for the corresponding routing entry having the destination node that is the same as the destination node of the data packet to be transmitted, so as to obtain a corresponding available routing entry having the source node that is the same as the source node of the data packet to be transmitted and having the destination node that is the same as the destination node of the data packet to be transmitted. Then an available routing entry corresponding to a latest updating time is selected from the found available routing entries according to a least recently used (LRU) principle, the source node and intermediate routing nodes recorded in the available routing entry are written to the result register, and a binary number 11 is written to the mode register to instruct the intermediate routing table to exit the search mode. After the source node and each intermediate routing node recorded in an available routing entry are written to the result register of the intermediate routing table, the intermediate routing node may be read from the result register to serve as the intermediate routing node of the data packet to be transmitted.

In some embodiments, if the available routing entry is not stored in the intermediate routing table, delay information of each node of the NoC is obtained. The delay information may indicate a delay of each node of the NoC in transmitting the data packet. Then the delay information, attribute information of the data packet to be transmitted, and identification information of the source node and the destination node of the data packet to be transmitted are inputted into a pre-trained traffic sensing model to obtain a new routing entry outputted by the traffic sensing model. The new routing entry includes at least one intermediate routing node, a source node corresponding to the new routing entry is the source node of the data packet to be transmitted, and a destination node corresponding to the new routing entry is the destination node of the data packet to be transmitted.

After the new routing entry is obtained, it is determined whether a deadlock or a livelock is formed between the data transmission path corresponding to the new routing entry and the data transmission path corresponding to each routing entry in the intermediate routing table. If the deadlock or the livelock is not formed, the new routing entry is stored into the intermediate routing table, and then each intermediate routing node included in the new routing entry is determined as the intermediate routing node corresponding to the data packet to be transmitted. If the deadlock or the livelock is formed, the new routing entry is regenerated through the traffic sensing model.

The pre-trained traffic sensing model may plan the data transmission path from the source node to the destination node based on the delay information of each node of the NoC, avoid the nodes with traffic congestion in the NoC, and shorten the time for transmitting the data packet to be transmitted from the source node to the destination node. The traffic sensing model may be obtained through training by reinforcement learning (RL), and a network structure of the traffic sensing model may be Q-leaning, deep Q network (DQN), and the like. The traffic sensing model may further be obtained through training of another type of neural network. For example, the traffic sensing model may be obtained through training of a convolutional neural network (CNN).

A delay collector is arranged in a router included by the nodes of the NoC. The delay collector may collect a delay when the nodes transmit data packets, calculate an average delay within N clock cycles, and then send one or more obtained average delays to a scheduling management unit after M clock cycles, where M is greater than N. The scheduling management unit may input the received average delay, the attribute information of the data packet to be transmitted, and the identification information of the source node and the destination node of the data packet to be transmitted into the traffic sensing model to obtain a new routing entry.

The attribute information of the data packet to be transmitted includes a location of a data packet, a size of the data packet, and the like.

In some embodiments of this disclosure, if the intermediate routing table does not store the available routing entry, delay information of each node of the NoC is obtained. The obtained delay information, attribute information of the data packet to be transmitted, and identification information of the source node and the destination node of the data packet to be transmitted are inputted into a traffic sensing model, to obtain a new routing entry outputted by the traffic sensing model. The intermediate routing node included in the new routing entry is determined as the intermediate routing node of the data packet to be transmitted. The traffic sensing model can plan a data transmission path with less delay based on the delay information of each node of the NoC, and the intermediate routing node in the new routing table outputted by the traffic sensing model defines the data transmission path, thereby determining the intermediate routing node in the new routing table as the intermediate routing node of the data packet to be transmitted, so that the data packet to be transmitted is transmitted to the intermediate routing nodes in sequence based on the XY routing algorithm. This avoids the node with traffic congestion, shortens the time for transmitting the data packet to be transmitted to the destination node, and improves the transmission efficiency of a data packet.

The new routing entry outputted by the traffic sensing model is stored into the intermediate routing table. For a data packet to be transmitted appearing soon after and of which a source node and a destination node are the same as those in the new routing entry, an intermediate routing node may be directly obtained by reading the new routing entry from the intermediate routing table, without the need to perform inference by using the traffic sensing model, reducing a transmission time of subsequent data packets to be transmitted.

RL is used as an example to describe the training process of the traffic sensing model below. The training process of the traffic sensing model may include the following steps S1 to S4.

In step S1, an initial training data set is generated through a hardware cycle-accurate simulator.

The simulator is a chip implemented by software, which may simulate the chip to perform corresponding data processing, for example, simulate a process of transmitting data packets between nodes that form an NoC in the chip. The hardware cycle-accurate simulator may be Bookim, Garnet, and the like.

The initial training data set includes a plurality of training samples, and the training samples include the following information:

(i) A source node and a destination node of a data packet, which indicate nodes from which and to which the data packet needs to be transmitted;

(ii) A data transmission state of each node of the NoC, such as a delay of each node in transmitting the data packet.

(iii) A transmission path of the data packet transmitted from the source node to the destination node.

It is to be noted that in addition to using the hardware cycle-accurate simulator, the initial training data set may further be generated using an event-driven simulator.

In step S2, an initial traffic sensing model is trained through the initial training data set.

The initial traffic sensing model is obtained by training a training sample in the initial training data set, so that the traffic sensing model has the ability to generate an intermediate routing node corresponding to the data packet based on the source node and the destination node of the data packet and the data transmission state of each node of the NoC, and the generated intermediate routing node may define the transmission path of the data packet.

It is to be understood that the initial traffic sensing model only has the ability to generate the intermediate routing node, but the accuracy of the generated intermediate routing node may be relatively low.

In step S3, a real-time training data set is collected through the simulator.

After the initial traffic sensing model is obtained, the initial traffic sensing model is combined with the simulator, and the intermediate routing node of the data packet to be transmitted in the simulator is determined through the initial traffic sensing model. The simulator transmits the data packet to be transmitted based on the intermediate routing node determined by the initial traffic sensing model, so as to obtain the delay of each node in transmitting the data packet to be transmitted. The manner in which the simulator transmits the data packet is the data packet transmission method described in the foregoing embodiments. That is, the data packet to be transmitted is transmitted to the intermediate routing nodes in sequence based on the XY routing algorithm.

A delay collector is arranged in the router in the node. The delay collector may collect the delay when the node transmits a data packet, and calculate an average delay within N clock cycles.

The real-time training data set includes a plurality of training samples, and the training samples include information such as an average delay corresponding to nodes.

In step S4, the initial traffic sensing model is trained through the real-time training data set based on RL, to obtain a traffic sensing model.

A training system based on RL may be Q-learning, DQN, and the like.

Figure 4:
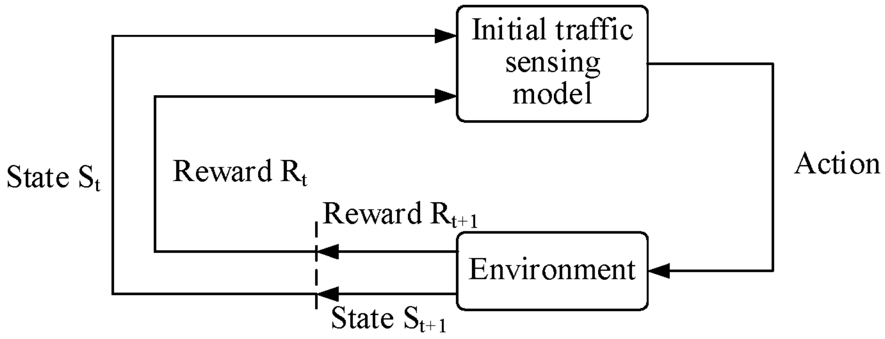
FIG. 4 is a schematic diagram for illustrating reinforcement learning (RL) according to some embodiments of this disclosure.

FIG. 4 is a schematic diagram for illustrating RL according to some embodiments of this disclosure. As shown in FIG. 4, an initial traffic sensing model is trained based on an environment, a state, an operation (behavior), and a reward of RL, to obtain a traffic sensing model. A state $S_t$ is a state corresponding to a $t^{th}$ data packet, a state $S_{t+1}$ is a state corresponding to a $(t+1)^{th}$ data packet, a reward $R_t$ is a reward corresponding to the $t^{th}$ data packet, a reward $R_{t+1}$ is a reward corresponding to the $(t+1)^{th}$ data packet, and t is a positive integer.

The environment of RL is a simulation environment of an NoC, and a topology and a routing policy of the simulation environment are consistent with those of a chip.

The state of RL is a real-time traffic state of each node of the NoC, including a data packet location, a data packet size, a data packet delay, an intermediate routing node corresponding to a data packet, and the like.

The operation of RL is an intermediate routing node corresponding to a next data packet transmission task.

The reward of RL is equal to a difference between a design delay and the data packet delay. The design delay is equal to a number of nodes on a data packet transmission path× node delay+specific delay. The node delay is determined based on a routing delay during transmission of data packets by nodes and a delay of transmission on wires between the nodes. For example, the routing delay is 5 clock cycles, and the delay of transmission on wires between the nodes is 1 clock cycle. The specific delay is determined based on a structure of the NoC and the number of nodes included. For example, a specific delay of a 3×3 NoC may be set to 5 clock cycles. If a deadlock or a livelock occurs on the data packet transmission path determined by the intermediate routing node outputted based on the initial traffic sensing model, a reward value is set to a large negative number. The data packet delay may be obtained from training samples in the real-time training data set.

The intermediate routing table has three registers, which are respectively a selection register, a result register, and a mode register. After a new routing entry including at least one intermediate routing node is obtained, a binary number 00 is written to the mode register to instruct the intermediate routing table to enter an insert mode. Then identification information of a source node and identification information of each intermediate routing node included in the new routing entry are written to the result register to instruct to insert the content of the new routing entry. Then the content stored in the result register of the intermediate routing table is read, and the read content is written to an empty entry or replaces an existing routing entry.

When the content stored in the result register of the intermediate routing table is written, if an empty entry exists in the intermediate routing table, the read content is stored into the empty entry to form a routing entry. If no empty entry exists in the intermediate routing table, the content of the corresponding routing entry with an earlier update time is replaced by the read content according to the LRU principle.

In some embodiments, if a deadlock or a livelock is formed between a data transmission path corresponding to the new routing entry and a data transmission path corresponding to the routing entry in the intermediate routing table, a negative incentive is generated, and delay information, attribute information of a data packet to be transmitted, the identification information of the source node and a destination node of the data packet to be transmitted, and the negative incentive are sent to a server, so that the server trains the traffic sensing model through RL.

Because the nodes of the NoC may transmit data packets simultaneously based on a plurality of data transmission paths defined by each routing entry in the intermediate routing table, the deadlock or the livelock may be formed between the data transmission path corresponding to the new routing entry outputted by the traffic sensing model and the data transmission path corresponding to each routing entry in the intermediate routing table, which may affect normal operation of the NoC. Therefore, before the new routing entry is stored into the intermediate routing table, a detection as to whether the new routing table may lead to a deadlock or a livelock is required.

After the delay information, the attribute information of the data packet to be transmitted, the identification information of the source node and the destination node of the data packet to be transmitted, and the negative incentive are sent to the server, the server may train the traffic sensing model through the information based on RL, so as to reduce a probability that the routing entry outputted by the traffic sensing model causes the deadlock or the livelock. The server sends the trained traffic sensing model, and then a scheduling management unit may subsequently generate a new routing entry through the updated traffic sensing model.

In some embodiments of this disclosure, if the new routing table leads to the deadlock or the livelock, a negative incentive is generated for the new routing entry, and the negative incentive is sent to the server, so that the server may train the traffic sensing model based on the negative incentive to reduce the probability that the routing entry outputted by the traffic sensing model causes the deadlock or the livelock. Then the new routing entry is generated through the updated traffic sensing model, thereby reducing a frequency of the deadlock or the livelock and improving stability and reliability of operation of the NoC.

In some embodiments, a delay collector is arranged in a router of each node of the NoC. The delay collector may collect a delay in transmitting a data packet by the node and calculate an average delay within N clock cycles. Then each node of the NoC may send the delay information calculated by the delay collector to the scheduling management unit, the scheduling management unit regularly sends the delay information to the server, and the server may train the traffic sensing model through the received delay information based on RL to continuously optimize the traffic sensing model. The server may send the trained traffic sensing model to the scheduling management unit by updating a driver, and then the scheduling management unit may generate a new routing entry through the trained traffic sensing model, so that a data transmission path defined by the new routing entry is more proper and efficient, thereby improving data transmission performance of the NoC.

In some embodiments, the data packet to be transmitted may correspond to one or more intermediate routing nodes. If the data packet to be transmitted corresponds to one intermediate routing node, the intermediate routing node is the destination node of the data packet to be transmitted. Then during transmission of the data packet to be transmitted, the data packet to be transmitted is transmitted from the source node to the destination node based on an XY routing algorithm. If the data packet to be transmitted corresponds to n intermediate routing nodes, where n is a positive integer greater than or equal to 2, an $n^{th}$ intermediate routing node of the n intermediate routing nodes is the destination node of the data packet to be transmitted. During transmission of the data packet to be transmitted, the data packet to be transmitted is transmitted from the source node to a first intermediate routing node based on the XY routing algorithm, and is transmitted from an $i^{th}$ intermediate routing node to an (i+1)th intermediate routing node based on the XY routing algorithm, where i is a positive integer less than n−1.

Figure 5:
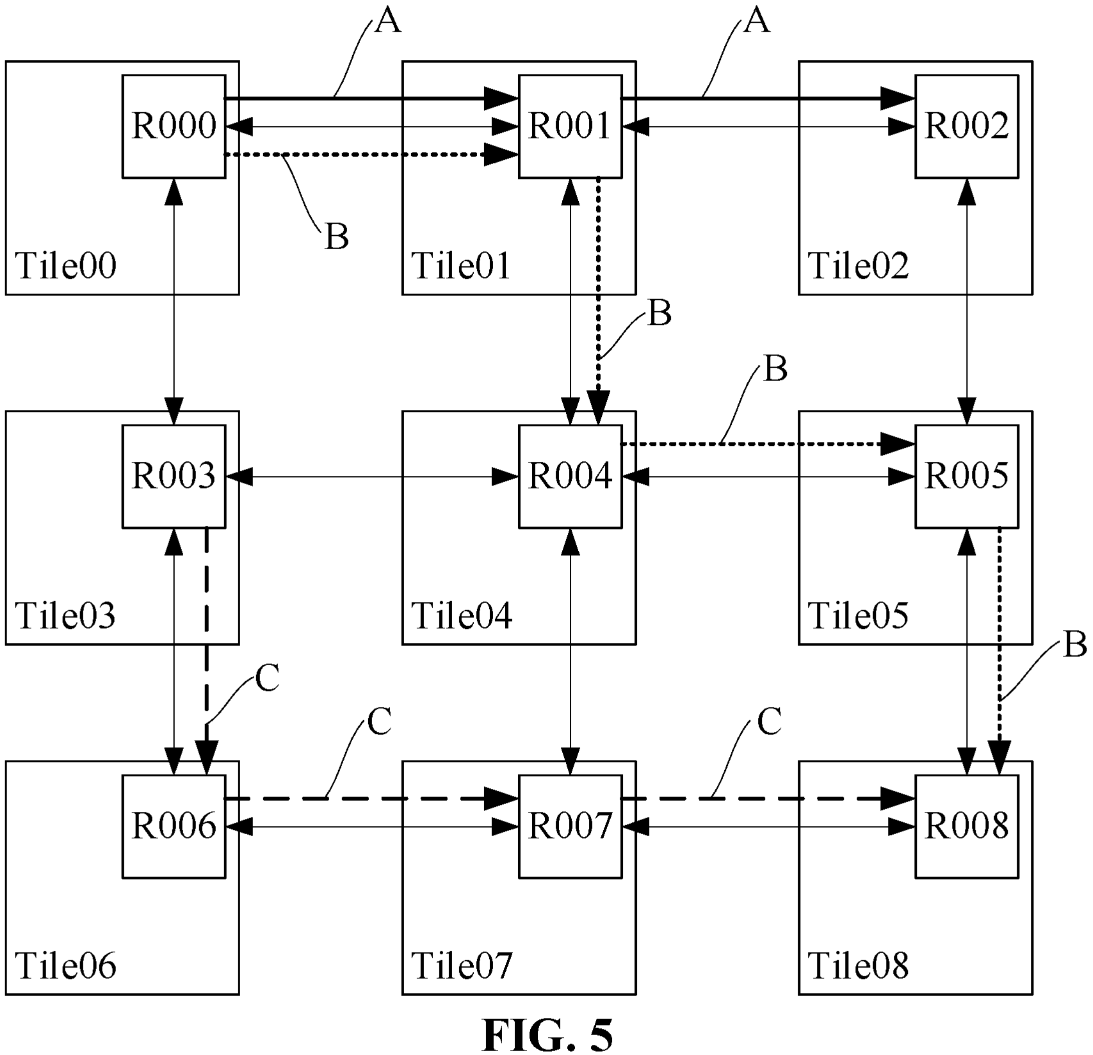
FIG. 5 is a schematic diagram of an exemplary network on chip (NoC) according to some embodiments of this disclosure.

FIG. 5 is a schematic diagram of an exemplary NoC according to some embodiments of this disclosure. As shown in FIG. 5, the NoC includes a total of 9 nodes, i.e., nodes Tile00 to Tile08. The nodes each include a router. The routers included by the nodes Tile00 to Tile08 are routers R000 to R008 in sequence. The routers R000 to R008 form a mesh network. Router R000 is respectively connected to the routers R001 and R003, router R001 is respectively connected to the routers R000, R002, and R004, router R002 is respectively connected to the routers R001 and R005, router R003 is respectively connected to the routers R000, R004, and R006, router R004 is respectively connected to the routers R001, R003, R005, and R007, router R005 is respectively connected to the routers R002, R004, and R008, router R006 is respectively connected to the routers R003 and R007, router R007 is respectively connected to the routers R004, R006, and R008, and router R008 is respectively connected to the routers R005 and R007.

A source node of a data packet to be transmitted A is node Tile00, and a destination node thereof is node Tile02. Then it is determined that an intermediate routing node of the data packet to be transmitted A is node Tile02. During transmission of the data packet to be transmitted A, based on the XY routing algorithm, node Tile00 transmits the data packet to be transmitted A to router R001 through router R000, router R001 transmits the data packet to be transmitted A to router R002, and node Tile02 obtains the data packet to be transmitted A from router R002.

A source node of a data packet to be transmitted B is node Tile00, and a destination node thereof is node Tile08. Then it is determined that intermediate routing nodes of the data packet to be transmitted B are the nodes Tile04 and Tile08. During transmission of the data packet to be transmitted B, based on the XY routing algorithm, node Tile00 transmits the data packet to be transmitted B to router R001 through router R000, router R001 transmits the data packet to be transmitted B to router R004, router R004 transmits the data packet to be transmitted B to router R005, router R005 transmits the data packet to be transmitted B to router R008, and node Tile08 obtains the data packet to be transmitted B from router R008.

A source node of a data packet to be transmitted C is node Tile03, and a destination node thereof is node Tile08. Then it is determined that intermediate routing nodes of the data packet to be transmitted C are the nodes Tile06 and Tile08. During transmission of the data packet to be transmitted C, based on the XY routing algorithm, node Tile03 transmits the data packet to be transmitted C to router R006 through router R003, router R006 transmits the data packet to be transmitted C to router R007, router R007 transmits the data packet to be transmitted C to router R008, and node Tile08 obtains the data packet to be transmitted C from router R008.

It is to be noted that in order to facilitate the management of the intermediate routing nodes, different data packets may be enabled to correspond to the same number of intermediate routing nodes. For example, each data packet corresponds to two intermediate routing nodes. In this case, if it is determined that the intermediate routing node corresponding to the data packet to be transmitted is a destination node of the data packet to be transmitted, that is, the data packet to be transmitted is directly transmitted from a source node to the destination node based on the XY routing algorithm, then the two intermediate routing nodes corresponding to the data packet to be transmitted are both the destination node of the data packet to be transmitted.

In some embodiments of this disclosure, the data packet to be transmitted may have one or more intermediate routing nodes. When one intermediate routing node exists, the data packet to be transmitted is transmitted from the source node to the destination node based on the XY routing algorithm. When a plurality of intermediate routing nodes exist, the data packet to be transmitted is transmitted to the intermediate routing nodes in sequence based on the XY routing algorithm, and the last intermediate routing node is the destination node. It can be seen that, due to an unlimited number of intermediate routing nodes, a more proper data transmission path may be determined based on the data transmission state of each node of the NoC, to ensure the efficiency of data packet transmission.

It is be noted that the data packet transmission method in some embodiments of this disclosure may be implemented based on a kernel mode driver.

Based on the foregoing chip, some embodiments of this disclosure provide a data packet transmission method. The data packet transmission method may be performed by node 22 in the foregoing embodiments.

Figure 6:
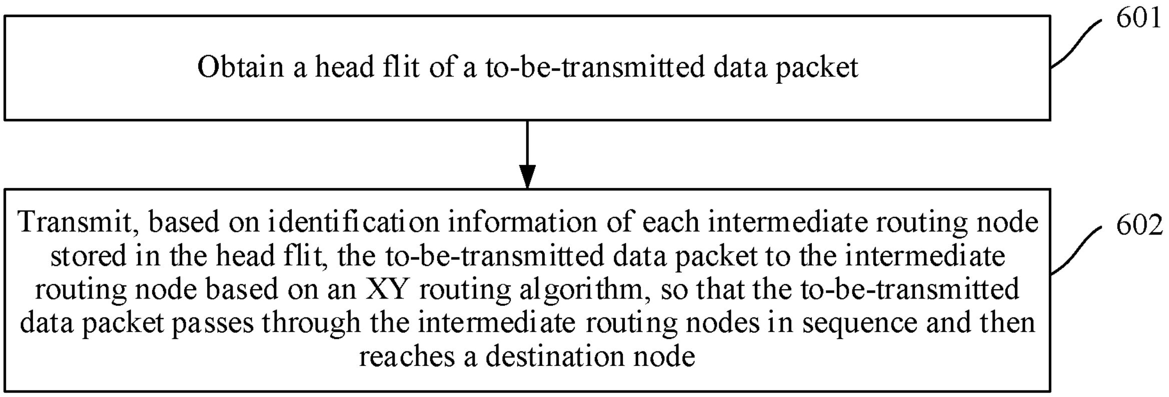
FIG. 6 is a flowchart of an exemplary data packet transmission method according to some embodiments of this disclosure.

FIG. 6 is a flowchart of an exemplary data packet transmission method 600 according to some embodiments of this disclosure. As shown in FIG. 6, data packet transmission method 600 includes the following steps 601 and 602.

In step 601, the node obtains a head flit of a data packet to be transmitted.

When a node of an NoC needs to send the data packet to be transmitted to another connected node, the node may obtain the head flit of the data packet to be transmitted. If a node is a source node of the data packet to be transmitted, the node may split the data packet to be transmitted into the head flit, a body flit, and a tail flit to directly obtain the head flit. If a node is not the source node of the data packet to be transmitted, the node may receive the data packet to be transmitted sent by another node, and during receiving of the data packet to be transmitted, the head flit of the data packet to be transmitted is to be first received.

The head flit of the data packet to be transmitted stores identification information of at least one intermediate routing node, and each intermediate routing node is determined based on the source node and a destination node of the data packet to be transmitted and a data transmission state of each node of the NoC. One of the intermediate routing nodes corresponding to the data packet to be transmitted is the destination node of the data packet to be transmitted.

It is to be noted that, for the process of determining each intermediate routing node corresponding to the data packet to be transmitted, reference may be made to the description in some of the above-described embodiments of the data packet transmission method applied to the scheduling management unit, and are not described herein again.

In step 602, the node transmits, based on the identification information of each intermediate routing node stored in the head flit, the data packet to be transmitted to the intermediate routing node based on an XY routing algorithm, so that the data packet to be transmitted passes through the intermediate routing nodes in sequence and then reaches the destination node.

The node determines, based on the identification information of each intermediate routing node stored in the head flit, a next intermediate routing node to which the data packet to be transmitted needs to be transmitted after obtaining the head flit of the data packet to be transmitted, and then transmits the data packet to be transmitted to the determined next intermediate routing node based on the XY routing algorithm, so that the data packet to be transmitted passes through each intermediate routing node in turn and then is transmitted to the destination node.

In some embodiments of this disclosure, each intermediate routing node corresponding to the data packet to be transmitted is determined based on the data transmission state of each node of the NoC, and the intermediate routing node serves as a node that the data packet to be transmitted needs to pass through during transmission to the destination node. The data packet to be transmitted is transmitted between the source node and the intermediate routing node and between the intermediate routing nodes based on the XY routing algorithm. Therefore, the intermediate routing node may determine a proper transmission path of the data packet to be transmitted, which avoids the node with traffic congestion in the NoC, and shortens the time for transmitting the data packet to be transmitted to the destination node, thereby improving the efficiency of transmitting the data packet in the NoC.

In some embodiments, if the current node is the source node of the data packet to be transmitted, during obtaining of the head flit of the data packet to be transmitted, the identification information of the at least one intermediate routing node from the scheduling management unit is received, and the received identification information is written to the head flit of the data packet to be transmitted, to obtain the head flit storing the identification information of the intermediate routing node. If the current node is not the source node of the data packet to be transmitted, the head flit of the data packet to be transmitted from an upstream node through the XY routing algorithm is received.

If the current node is the source node of the data packet to be transmitted, the data packet to be transmitted is sent from the node, and the node is to split the data packet to be transmitted into a head flit, a body flit, and a tail flit. The node stores, into the head flit of the data packet to be transmitted, the identification information of each intermediate routing node corresponding to the data packet to be transmitted after receiving the identification information of the at least one intermediate routing node corresponding to the data packet to be transmitted sent by the scheduling management unit. Then the node sends, based on the XY routing algorithm according to the identification information of each intermediate routing node stored in the head flit of the data packet to be transmitted, the data packet to be transmitted to a first intermediate routing node that the data packet to be transmitted needs to reach.

If the current node is not the source node of the data packet to be transmitted, then the node receives the data packet to be transmitted sent from the upstream node thereof based on the XY routing algorithm, and the data packet to be transmitted is transmitted to the nodes in sequence based on a sequence of the head flit, the body flit, and the tail flit, thereby obtaining the head flit of the data packet to be transmitted.

Turning back to FIG. 5, if the current node is node Tile00 and the data packet to be transmitted is a data packet to be transmitted A, node Tile00 receives the identification information of node Tile02 sent by the scheduling management unit, and then stores the identification information of node Tile02 into the head flit of the data packet to be transmitted A. If the current node is node Tile04 and the data packet to be transmitted is a data packet to be transmitted B, then node Tile04 receives the head flit sent by node Tile01. The head flit stores the identification information of each intermediate routing node corresponding to the data packet to be transmitted B, that is, stores the identification information of the nodes Tile04 and Tile08. If the current node is node Tile07 and the data packet to be transmitted is a data packet to be transmitted C, then node Tile07 receives the head flit sent by node Tile06. The head flit stores the identification information of each intermediate routing node corresponding to the data packet to be transmitted C, that is, stores the identification information of the nodes Tile06 and Tile08.

In some embodiments of this disclosure, the source node of the data packet to be transmitted receives the identification information of the intermediate routing node from the scheduling management unit, and stores the received identification information into the head flit of the data packet to be transmitted. Another node that is not the source node of the data packet to be transmitted first receives the head flit of the data packet to be transmitted when receiving the data packet to be transmitted, and then all nodes on the transmission path of the data packet to be transmitted may transmit the data packet to be transmitted to the next intermediate routing node based on the identification information of the intermediate routing node stored in the head flit according to the XY routing algorithm, so as to avoid a problem such as a deadlock or a livelock while improving transmission efficiency of a data packet, thereby ensuring reliability of operation of the NoC.

In some embodiments, if the current node is the source node of the data packet to be transmitted, then the current node may write the identification information of each intermediate routing node to the head flit of the data packet to be transmitted in sequence based on a requirement on an order in which the data packet to be transmitted reaches the intermediate routing nodes after receiving the identification information of the at least one intermediate routing node from the scheduling management unit, so that the head flit of the data packet to be transmitted stores the identification information of the source node of the data packet to be transmitted and the identification information of the intermediate routing nodes in sequence.

The head flit stores the identification information of the source node and the identification information of each intermediate routing node of the data packet to be transmitted, and the identification information of the source node and the identification information of each intermediate routing node are stored into the head flit in sequence. If a plurality of intermediate routing nodes exist, then the identification information of the intermediate routing nodes is stored after the identification information of the source node based on a requirement on an order in which the data packet to be transmitted reaches the intermediate routing nodes. In addition, the identification information of the intermediate routing node that the data packet to be transmitted reaches first is positioned before the identification information of the intermediate routing node that the data packet to be transmitted reaches later based on the order requirement.

For example, the intermediate routing node of the data packet to be transmitted includes an intermediate routing node 1, an intermediate routing node 2, and an intermediate routing node 3. The data packet to be transmitted needs to pass through the intermediate routing node 1, the intermediate routing node 2, and the intermediate routing node 3 in sequence during transmission from the source node to the destination node, and then the head flit of the data packet to be transmitted stores the identification information of the source node, the identification information of the intermediate routing node 1, the identification information of the intermediate routing node 2, and the identification information of the intermediate routing node 3 of the data packet to be transmitted in sequence.

If the current node is not the source node of the data packet to be transmitted, after the current node receives the head flit transmitted from the upstream node through the XY routing algorithm, the current node may then parse the head flit of the data packet to be transmitted to obtain the identification information of the source node of the data packet to be transmitted and the identification information of each intermediate routing node of the data packet to be transmitted. Then, the requirement on the order in which the data packet to be transmitted reaches the intermediate routing nodes may be determined based on the sequence in which the identification information of each intermediate routing node is stored.

If the data packet to be transmitted has a plurality of intermediate routing nodes, the identification information of the source node of the data packet to be transmitted and the identification information of each intermediate routing node may be obtained after the head flit of the data packet to be transmitted is parsed. The identification information of each intermediate routing node is stored after the identification information of the source node in sequence based on the requirement on the order in which the data packet to be transmitted reaches the intermediate routing nodes. Therefore, after the identification information of each intermediate routing node is parsed, the requirement on the order in which the data packet to be transmitted reaches the intermediate routing nodes may be determined based on the sequence in which the identification information of each intermediate routing node is stored, and then a node to which the data packet to be transmitted needs to be sent is determined.

For example, the head flit of the data packet to be transmitted is parsed to obtain the identification information of the source node, identification information of an intermediate routing node 4, and identification information of an intermediate routing node 5, so that it may be determined that the data packet to be transmitted needs to reach the intermediate routing node 4 first and then reach the intermediate routing node 5.

In some embodiments of this disclosure, the head flit stores the identification information of the source node of the data packet to be transmitted and the identification information of each intermediate routing node, and the identification information of each intermediate routing node is stored after the identification information of the source node in sequence based on the requirement on the order in which the data packet to be transmitted reaches the intermediate routing nodes. The identification information of each intermediate routing node may be obtained through parsing of the head flit, and then the requirement on the order in which the data packet to be transmitted reaches the intermediate routing nodes may be determined based on the sequence in which the identification information of each intermediate routing node is stored, so as to ensure that the data packet to be transmitted can be transmitted to the intermediate routing nodes in sequence based on the XY routing algorithm.

In some embodiments, when a node transmits a data packet to be transmitted based on the identification information stored in the head flit, it may be determined whether the current node is the intermediate routing node of the data packet to be transmitted based on the identification information of each intermediate routing node stored in the head flit. If the current node is the intermediate routing node of the data packet to be transmitted and the current node is not the destination node of the data packet to be transmitted, a flit included in the received data packet to be transmitted is stored into a buffer. After each flit included in the data packet to be transmitted is stored into the buffer, each flit of the data packet to be transmitted stored in the buffer is transmitted to a next intermediate routing node based on the XY routing algorithm.

Because the head flit stores the identification information of the source node and each intermediate routing node of the data packet to be transmitted, and each intermediate routing node includes the destination node of the data packet to be transmitted, after a node receives the head flit of the data packet to be transmitted, it may be determined, based on the identification information stored in the head flit, whether the node is the intermediate routing node of the data packet to be transmitted and whether the node is the destination node of the data packet to be transmitted. If the current node is the destination node of the data packet to be transmitted, the transmission of the data packet to be transmitted is stopped after each flit of the data packet to be transmitted is received. If the current node is not the destination node of the data packet to be transmitted, the transmission of the data packet to be transmitted needs to be continued based on the identification information stored in the head flit.

If the current node is the intermediate routing node of the data packet to be transmitted, and the current node is not the destination node of the data packet to be transmitted, the current node then receives the head flit, the body flit, and the tail flit of the data packet to be transmitted in sequence, and stores the received head flit, body flit, and tail flit into the buffer. After the head flit, the body flit, and the tail flit of the data packet to be transmitted are all stored into the buffer, the head flit, the body flit, and the tail flit in the buffer are sent to the next intermediate routing node based on the XY routing algorithm. During transmission of the head flit, the body flit, and the tail flit of the data packet to be transmitted to the next intermediate routing node, the current node still transmits each flit based on the sequence of the head flit, the body flit, and the tail flit.

The head flit of the data packet to be transmitted stores data volume information of the data packet to be transmitted, and it may be determined, based on the data volume information, whether each flit included in the data packet to be transmitted has been stored into the buffer.

A buffer is arranged in a router of each node. The capacity of the buffer is greater than an upper limit of the data volume of a transmitted packet in the NoC. That is, any packet transmitted in the NoC can be stored into the buffer.

As shown in FIG. 5, after node Tile04 receives the head flit of the data packet to be transmitted B, it is determined, based on the identification information of the intermediate routing node stored in the head flit, that node Tile04 is the intermediate routing node of the data packet to be transmitted B and is not the destination node of the data packet to be transmitted B. Then, node Tile04 stores, in the buffer of router R004, each flit of the data packet to be transmitted B that is subsequently received. After each flit of the data packet to be transmitted B is stored into the buffer of router R004, the flit in the buffer of router R004 is sent to node Tile08 based on the XY routing algorithm according to the identification information of the intermediate routing node stored in the head flit. That is, the flit in the buffer of router R004 is sent to node Tile05.

In some embodiments of this disclosure, a buffer is arranged in the router of the node. When a node is used as an intermediate routing node of the data packet to be transmitted and the node is not the destination node of the data packet to be transmitted, the node stores the received flit in the buffer after receiving the flit of the data packet to be transmitted, and then sends the flit in the buffer to the next intermediate routing node based on the XY routing algorithm after storing all of the flits of the data packet to be transmitted into the buffer. In this way, a data transmission path between the source node and the first intermediate routing node and a data transmission path between two adjacent intermediate routing nodes both satisfy the XY routing algorithm, and the data transmission path between the source node and the destination node that does not satisfy the XY routing algorithm is split into a plurality of subpaths that satisfy the XY routing algorithm, so as to avoid the problem such as the deadlock or the livelock in the data packet transmission process, and ensure the reliability of data packet transmission in the NoC while improving the transmission efficiency of a data packet.

In some embodiments, if the current node is not the intermediate routing node corresponding to the data packet to be transmitted, the received flit included in the data packet to be transmitted is then transmitted to the next intermediate routing node based on the XY routing algorithm.

If the current node is not the intermediate routing node of the data packet to be transmitted, then the node is a node on the data transmission path between the source node and the first intermediate routing node, or a node on the transmission path between two adjacent intermediate routing nodes. The node transmits the received flit to the next intermediate routing node in the form of a data stream based on the XY routing algorithm after receiving the flit of the data packet to be transmitted, without the need to store all of the flits of the data packet to be transmitted into a buffer before transmitting the flits of the data packet to be transmitted to the next intermediate routing node.

As shown in FIG. 5, after node Tile01 receives the head flit of the data packet to be transmitted A, it is determined, based on the identification information of the intermediate routing node stored in the head flit, that node Tile01 is not the intermediate routing node of the data packet to be transmitted A, and then node Tile01 sends the received flit of the data packet to be transmitted A to node Tile04 in the form of a data stream.

In some embodiments of this disclosure, if a node is not an intermediate routing node of a data packet to be transmitted, and the node satisfies the XY routing algorithm when transmitting the data packet to be transmitted, a deadlock or a livelock is not caused. Therefore, not all of the flits of the data packet to be transmitted need to be stored into the buffer, and then each flit in the buffer is transmitted to the next intermediate routing node based on the XY routing algorithm, thereby saving the time for storing each flit in the buffer and ensuring the efficiency of transmitting the data packet in the NoC.

In some embodiments, if the current node is the intermediate routing node of the data packet to be transmitted, the current node then adds an invalid identifier to the identification information of the current node stored in the head flit after storing the head flit of the data packet to be transmitted in the buffer. Correspondingly, when a node transmits a data packet to be transmitted to an intermediate routing node based on the XY routing algorithm, next label information without the invalid identifier may be determined as destination label information based on the sequence in which each identification information is stored in the head flit, and then the data packet to be transmitted is transmitted to the intermediate routing node identified by destination identification information based on the XY routing algorithm.

As shown in FIG. 5, the head flit of the data packet to be transmitted B stores identification information Tile00, Tile04, and Tile08 in sequence. Tile00 is the identification information of the source node, and Tile04 and Tile08 are the identification information of two intermediate routing nodes. After node Tile04 receives the head flit of the data packet to be transmitted B, it is determined that node Tile04 is the intermediate routing node of the data packet to be transmitted B based on the identification information stored in the head flit. Node Tile04 stores the head flit of the data packet to be transmitted B in the buffer, and then adds an invalid identifier to the identification information Tile04 in the head flit. After node Tile04 stores each flit of the data packet to be transmitted B in the buffer, based on the identification information stored in the head flit, because the invalid identifier has been added to the identification information Tile04 of the first intermediate routing node, then the flit stored in the buffer is transmitted to node Tile08 based on the XY routing algorithm. After node Tile06 receives the head flit of the data packet to be transmitted B, based on the identification information stored in the head flit, because the invalid identifier has been added to the identification information Tile04 of the first intermediate routing node, then the received flit is transmitted to node Tile08 in the form of a data stream based on the XY routing algorithm.

In some embodiments of this disclosure, the identification information of each intermediate routing node is stored in the head flit in sequence. After the head flit is transmitted to an intermediate routing node, the intermediate routing node adds invalid information to the identification information thereof stored in the head flit, to enable the current intermediate routing node and subsequent nodes to determine the next intermediate routing node, thereby ensuring correctness of data packet transmission.

Figure 7:
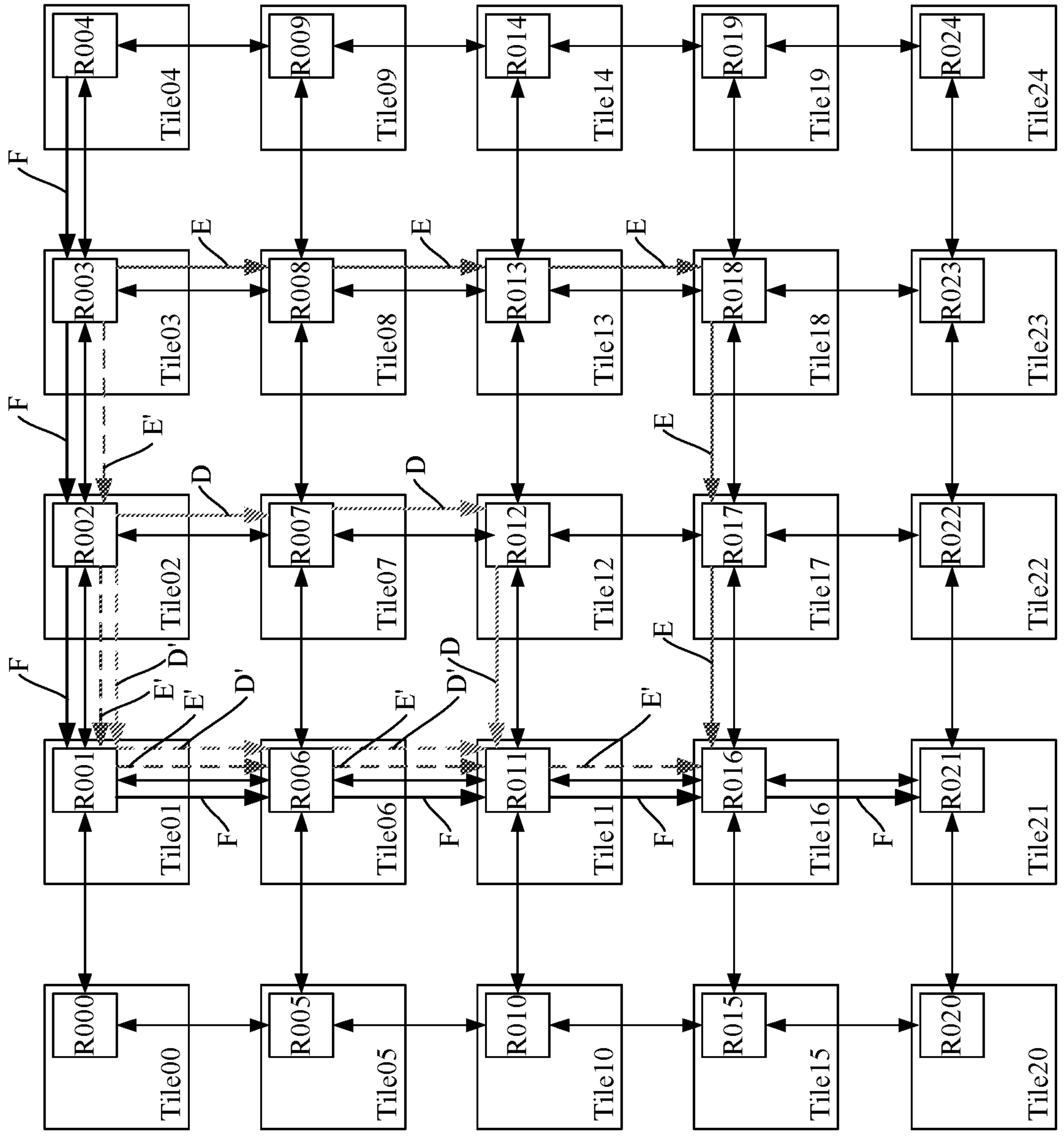
FIG. 7 is a schematic diagram of an exemplary NoC according to some embodiments of this disclosure.

FIG. 7 is a schematic diagram of an exemplary NoC according to some embodiments of this disclosure. As shown in FIG. 7, the NoC includes a total of 25 nodes, i.e., nodes Tile00 to Tile24. The nodes each include a router. The routers included by the nodes Tile00 to Tile24 are routers R000 to R024 in sequence. The connected routers R000 to R024 form a 5×5 mesh network.

A data packet to be transmitted D, a data packet to be transmitted E, and a data packet to be transmitted F are simultaneously transmitted in an NoC. A source node of the data packet to be transmitted D is node Tile02, and a destination node thereof is Tile11. A source node of the data packet to be transmitted E is node Tile03, and a destination node thereof is Tile16. A source node of the data packet to be transmitted F is node Tile04, and a destination node thereof is Tile21.

If the data packet to be transmitted D, the data packet to be transmitted E, and the data packet to be transmitted F are transmitted based on the conventional traditional XY routing algorithm, a transmission path of the data packet to be transmitted D is Tile02→Tile01→Tile06→Tile11 (denoted as D' in the figure), a transmission path of the data packet to be transmitted E is Tile03→Tile02→Tile01→Tile06→Tile11→Tile16 (denoted as E' in the figure), and a transmission path of the data packet to be transmitted F is Tile04→Tile03→Tile02→Tile01→Tile06→Tile11→Tile16→Tile21 (denoted as F in the figure). Because congestion occurs at node Tile02 of the data packet to be transmitted E and the data packet to be transmitted D, and congestion occurs at node Tile03 of the data packet to be transmitted F and the data packet to be transmitted E, the data packets to be transmitted queue up. A delay in transmitting the data packet to be transmitted D is 521 clock cycles, a delay in transmitting the data packet to be transmitted E is 1039 clock cycles, and a delay in transmitting the data packet to be transmitted F is 1557 clock cycles.

If the data packet to be transmitted D, the data packet to be transmitted E, and the data packet to be transmitted F are transmitted according to the data packet transmission method of some embodiments, the transmission path of the data packet to be transmitted D is Tile02→Tile07→Tile12→Tile11 (denoted as D in the figure), a transmission path of the data packet to be transmitted E is Tile03→Tile08→Tile13→Tile18→Tile17→Tile16 (denoted as E in the figure), and a transmission path of the data packet to be transmitted F is Tile04→Tile03→Tile02→Tile01→Tile06→Tile11→Tile16→Tile21 (denoted as F in the figure). The data transmission paths of the data packet to be transmitted D, the data packet to be transmitted E, and the data packet to be transmitted F do not overlap, and traffic congestion will not occur. The delay in transmitting the data packet to be transmitted D is 521 clock cycles, the delay in transmitting the data packet to be transmitted E is 527 clock cycles, and the delay in transmitting the data packet to be transmitted F is 533 clock cycles. However, the data packet to be transmitted D, the data packet to be transmitted E, and the data packet to be transmitted F are transmitted simultaneously, and therefore the total delay is 533 clock cycles.

Without considering influence of other factors, compared with a delay in transmitting the data packet to be transmitted D, the data packet to be transmitted E, and the data packet to be transmitted F based on the conventional XY routing algorithm, a delay in transmitting the data packet to be transmitted D, the data packet to be transmitted E, and the data packet to be transmitted F based on some embodiments of the present disclosure is reduced by (1557−533)/1557-65.77%, which can significantly improve the efficiency of transmitting the data packets in the NoC.

Figure 8:
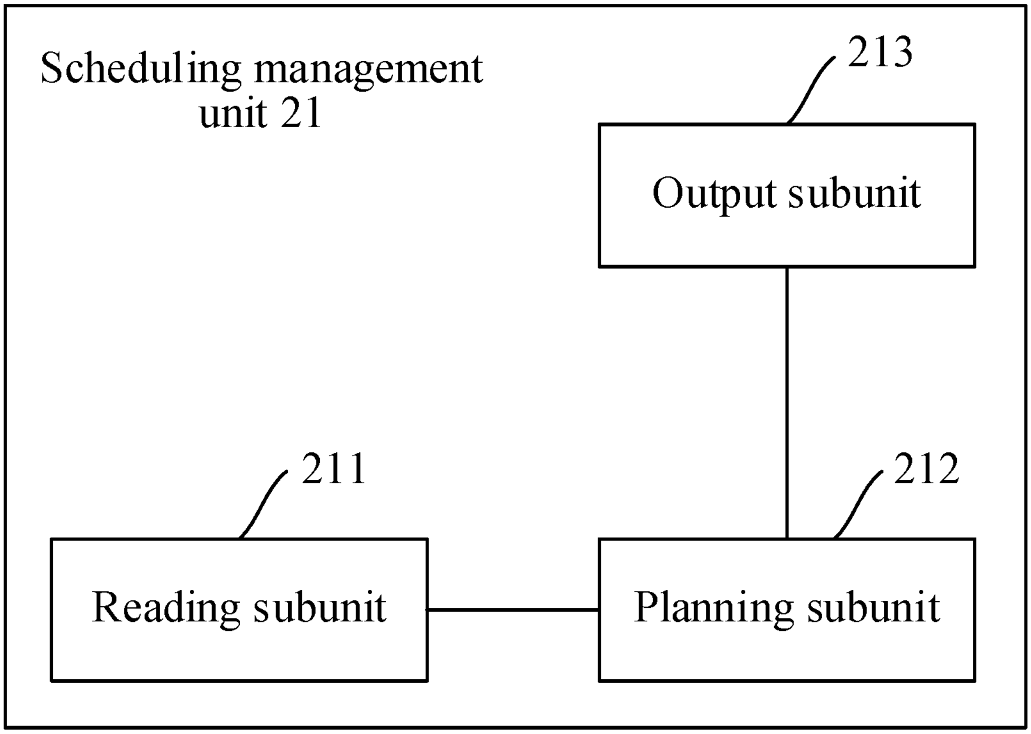
FIG. 8 is a schematic diagram of an exemplary scheduling management unit according to some embodiments of this disclosure.

Corresponding to the some of the above-described embodiments of the data packet transmission method applied to the scheduling management unit, FIG. 8 shows a schematic diagram of an exemplary scheduling management unit according to some embodiments of this disclosure. As shown in FIG. 8, scheduling management unit 21 includes a reading subunit 211, a planning subunit 212, and an output subunit 213.

Reading subunit 211 includes circuitry configured to determine a source node and a destination node of a data packet to be transmitted.

Planning subunit 212 includes circuitry configured to determine at least one intermediate routing node corresponding to the data packet to be transmitted based on the source node and the destination node of the data packet to be transmitted and a data transmission state of each node of an NoC.

Output subunit 213 includes circuitry configured to transmit identification information of the at least one intermediate routing node to the source node of the data packet to be transmitted, so that the source node of the data packet to be transmitted writes the identification information of the at least one intermediate routing node to a head flit of the data packet to be transmitted, to enable the data packet to be transmitted to be transmitted to the intermediate routing nodes in sequence based on an XY routing algorithm and then reach the destination node of the data packet to be transmitted.

In some embodiments of this disclosure, planning subunit 212, specifically the circuitry within planning subunit 212 (the same below), determines at least one intermediate routing node corresponding to the data packet to be transmitted based on the source node and the destination node of the data packet to be transmitted and the data transmission state of each node of the NoC. After output subunit 213 sends the identification information of each intermediate routing node to the source node of the data packet to be transmitted, the source node stores the identification information of each intermediate routing node into the head flit of the data packet to be transmitted, so that the node of the NoC may transmit the data packet to be transmitted to the intermediate routing nodes in sequence based on the XY routing algorithm, and then transmit the data packet to be transmitted to the destination node. Because the intermediate routing node is determined based on the data transmission state of each node of the NoC, the intermediate routing node, as a node through which the data packet to be transmitted passes, may determine a proper transmission path of the data packet to be transmitted, which avoids the node with data traffic congestion, and shortens a time for transmitting the data packet to be transmitted to the destination node, thereby improving efficiency of transmitting the data packet.

It is to be noted that the scheduling management unit of some embodiments is configured to implement the data packet transmission method applied to the scheduling management unit in the some of the method embodiments described above, and has the beneficial effects of the corresponding method embodiments. The details are not described herein again.

Figure 9:
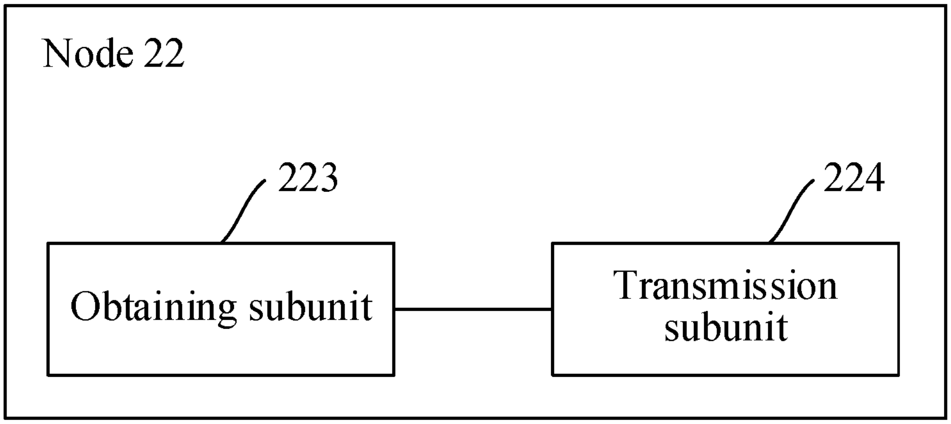
FIG. 9 is a schematic diagram of an exemplary node of an NoC according to some embodiments of this disclosure.

Corresponding to some of the above-described embodiments of the data packet transmission method applied to the node, FIG. 9 shows an exemplary schematic diagram of a node of an NoC according to some embodiments of this disclosure. As shown in FIG. 8, node 22 includes an obtaining subunit 223 and a transmission subunit 224.

Obtaining subunit 223 includes circuitry configured to obtain a head flit of a data packet to be transmitted, where the head flit stores identification information of at least one intermediate routing node, and the at least one intermediate routing node is determined based on a source node and a destination node of the data packet to be transmitted and a data transmission state of each node of the NoC.

Transmission subunit 224 includes circuitry configured to transmit, based on the identification information of each intermediate routing node stored in the head flit, the data packet to be transmitted to the intermediate routing node based on an XY routing algorithm, so that the data packet to be transmitted passes through the intermediate routing nodes in sequence and then reaches the destination node.

In some embodiments of this disclosure, each intermediate routing node corresponding to the data packet to be transmitted is determined based on the data transmission state of each node of the NoC, and the intermediate routing node serves as a node that the data packet to be transmitted needs to pass through during transmission to the destination node. The data packet to be transmitted is transmitted between the source node and the intermediate routing node and between the intermediate routing nodes based on the XY routing algorithm. Therefore, the intermediate routing node may determine a proper transmission path of the data packet to be transmitted, which avoids the node with traffic congestion in the NoC, and shortens the time for transmitting the data packet to be transmitted to the destination node, thereby improving the efficiency of transmitting the data packet in the NoC.

It is to be noted that the node of some embodiments is configured to implement the data packet transmission method applied to the node in some of the method embodiments described above, and has the beneficial effects of the corresponding method embodiments. The details are not described herein again.

Figure 10:
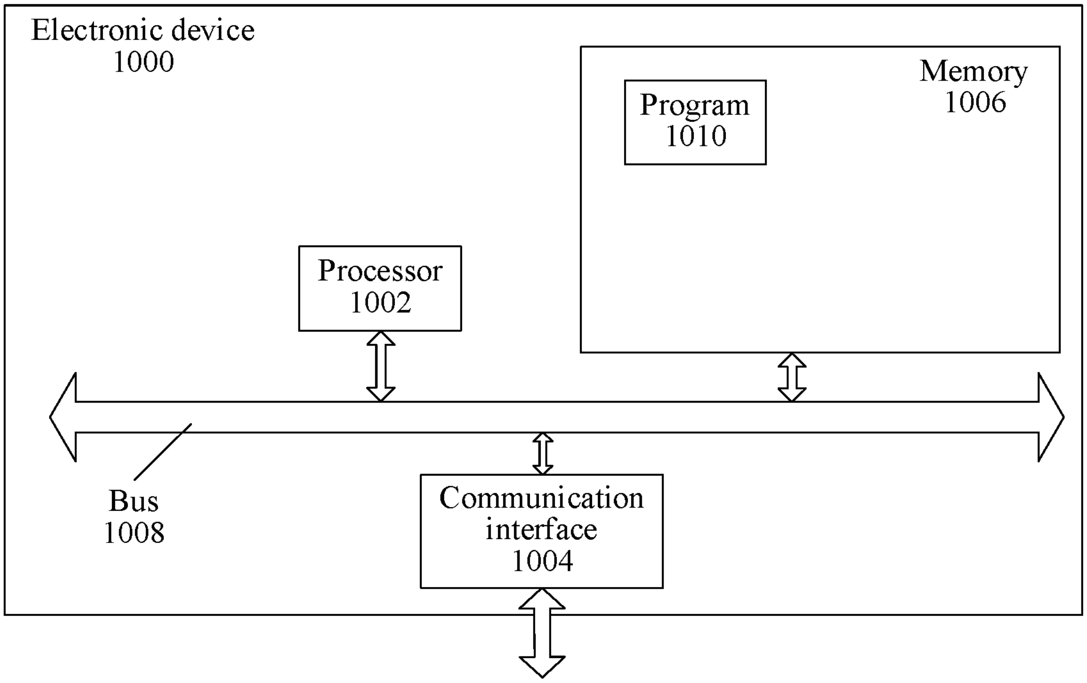
FIG. 10 is a schematic diagram of an exemplary electronic device according to some embodiments of this disclosure.

FIG. 10 is a schematic block diagram of an exemplary electronic device 1000 according to some embodiments of this disclosure, and a specific implementation of the electronic device is not limited in a specific embodiment of this disclosure. As shown in FIG. 10, electronic device 1000 may include a processor 1002, a communication interface 1004, a memory 1006, and a communication bus 1008.

Processor 1002, communication interface 1004, and memory 1006 communicate with each other through a communication bus 1008.

Communication interface 1004 is configured to communicate with another electronic device 1000 or a server.

Processor 1002 is configured to execute a program 1010, and specifically may perform related steps in any of the foregoing embodiments of the data packet transmission method.

Specifically, program 1010 may include program code. The program code includes computer operation instructions.

Processor 1002 may be a CPU, or an application specific integrated circuit (ASIC), or one or more integrated circuits configured to implement some embodiments of this disclosure. One or more processors included in a smart device may be a same type of processor, such as one or more CPUs, or may be different types of processors, such as one or more CPUs and one or more ASICs.

RISC-V is an open source instruction set architecture based on the principle of reduced instruction set computer (RISC), which may be applied to various aspects such as a single chip microcomputer and an FPGA chip, and may be specifically applied to the fields such as Internet of Things security, industrial control, mobile phones, and personal computers. Moreover, because practical requirements such as a small size, a high speed, and a low power consumption were considered when the RISC-V was designed, the RISC-V is particularly suitable for modern computing devices such as warehouse-scale cloud computers, high-end mobile phones, and miniature embedded systems. With the rise of artificial intelligence Internet of Things (AIoT), the RISC-V instruction set architecture has received more and more attention and support, and is expected to become the next generation CPU architecture that is widely used.

The computer operation instructions in some embodiments of this disclosure may be computer operation instructions based on the RISC-V instruction set architecture, and correspondingly, processor 1002 may be designed based on the RISC-V instruction set. Specifically, a chip of the processor in the electronic device provided in some embodiments of this disclosure may be a chip designed by adopting the RISC-V instruction set, and the chip may execute executable codes based on the configured instructions, thereby implementing the data packet transmission method in some of the embodiments described above.

Memory 1006 is configured to store program 1010. Memory 1006 may include a high-speed RAM memory, and may also include a non-volatile memory, such as at least one disk memory.

Program 1010 may specifically be configured to enable processor 1002 to perform the data packet transmission method in any of the above embodiments.

For the specific implementation of each step in program 1010, reference may be made to the corresponding descriptions in the corresponding steps and units in any of the above embodiments of the data packet transmission method, and are not described herein again. It is appreciated that, for the purpose of convenient and brief description, for a detailed working process of the foregoing device and module, reference may be made to the description of a corresponding process in the foregoing method embodiments, and the details are not described herein again.

Through the electronic device in some embodiments of this disclosure, at least one intermediate routing node corresponding to the data packet to be transmitted is determined based on the source node and the destination node of the data packet to be transmitted and the data transmission state of each node of the NoC. After the identification information of each intermediate routing node is sent to the source node of the data packet to be transmitted, the source node stores the identification information of each intermediate routing node into the head flit of the data packet to be transmitted, so that the node of the NoC may transmit the data packet to be transmitted to the intermediate routing nodes in sequence based on the XY routing algorithm, and then transmit the data packet to be transmitted to the destination node. Because the intermediate routing node is determined based on the data transmission state of each node of the NoC, the intermediate routing node, as a node through which the data packet to be transmitted passes, may determine a proper transmission path of the data packet to be transmitted, which avoids the node with data traffic congestion, and shortens a time for transmitting the data packet to be transmitted to the destination node, thereby improving efficiency of transmitting the data packet.

This disclosure further provides a computer-readable storage medium, storing instructions used for enabling a machine to perform the data packet transmission method as described herein. Specifically, a system or device equipped with a storage medium may be provided. The storage medium stores software program code for implementing the functions of any of the above embodiments, and enables a computer (or CPU or MPU) of the system or device to read and execute the program code stored in the storage medium.

In this case, the program code read from the storage medium may implement the functions of any of the above embodiments. Therefore, the program code and the storage medium storing the program code form a part of this disclosure.

Embodiments of the storage medium for providing program code include a floppy disk, a hard disk, a magneto-optical disk, an optical disk (such as a CD-ROM, a CD-R, a CD-RW, a DVD-ROM, a DVD-RAM, a DVD-RW, or a DVD+RW), a magnetic tape, a non-volatile storage card, and a ROM. Optionally, the program code may be downloaded from a server computer through a communication network.

Some embodiments of this disclosure further provide a computer program product, including computer instructions. The computer instructions instruct a computing device to perform a corresponding operation in any of the plurality of method embodiments above.

It is to be noted that the user-related information (including but not limited to user device information, user personal information, and the like) and data (including but not limited to sample data for model training, data for analysis, stored data, displayed data, and the like) involved in some embodiments of this disclosure are all information and data authorized by users or fully authorized by all parties, and the collection, use, and processing of relevant data need to comply with relevant laws, regulations, and standards of relevant countries and regions. A corresponding operation entry is provided for the user to choose authorization or rejection.

It is to be noted that, according to requirements of implementation, each component/step described in some embodiments of this disclosure may be split into more components/steps, and two or more components/steps or partial operations of components/steps may be combined into new components/steps to achieve the objects of some embodiments of this disclosure.

The above method according to some embodiments of this disclosure may be implemented in hardware and firmware, or implemented as software or computer code that may be stored in a recording medium (such as a CD ROM, a RAM, a floppy disk, a hard disk, or a magneto-optical disk), or as computer code that is originally stored in a remote recording medium or a non-transitory machine-readable medium and to be stored in a local recording medium and downloaded through a network, so that the method described herein may be stored in such a software on a recording medium using a general-purpose computer, a dedicated processor, or programmable or dedicated hardware (such as an ASIC or an FPGA) for processing. It may be understood that a computer, a processor, a microprocessor controller, or programmable hardware includes a storage component (for example, a RAM, a ROM, and a flash memory) that may store or receive software or computer code. The method described herein is implemented when the software or computer code is accessed and executed by the computer, the processor, or the hardware. Furthermore, when a general-purpose computer accesses the code for implementing the method shown herein, the execution of the code converts the general-purpose computer into a special-purpose computer for performing the method shown herein.

The embodiments may further be described using the following clauses:

1. A data packet transmission method, including:

determining a source node and a destination node of a data packet to be transmitted;

determining at least one intermediate routing node corresponding to the data packet to be transmitted based on the source node and the destination node of the data packet to be transmitted and a data transmission state of each node in a network on chip (NoC); and transmitting identification information of the at least one intermediate routing node to the source node of the data packet to be transmitted, so that the source node of the data packet to be transmitted writes the identification information of the at least one intermediate routing node to a head flit of the data packet to be transmitted, to enable the data packet to be transmitted to be transmitted to the at least one intermediate routing node in sequence based on an XY routing algorithm and then reach the destination node of the data packet to be transmitted.

2. The method according to clause 1, wherein the determining the at least one intermediate routing node includes:

detecting whether an intermediate routing table stores at least one available routing entry, a source node corresponding to the available routing entry being the source node of the data packet to be transmitted, a destination node corresponding to the available routing entry being the destination node of the data packet to be transmitted, wherein the available routing entry includes at least one intermediate routing node, and the available routing entry is determined based on the data transmission state of each node of the NoC; and determining, if the intermediate routing table stores the at least one available routing entry, each intermediate routing node included in an available routing entry corresponding to a latest updating time as the at least one intermediate routing node corresponding to the data packet to be transmitted.

3. The method according to clause 2, wherein the determining the at least one intermediate routing node further includes:

obtaining delay information of each node of the NoC if the intermediate routing table does not store the available routing entry, the delay information indicating a delay of each node of the NoC in transmitting the data packet;

inputting the delay information, attribute information of the data packet to be transmitted, and identification information of the source node and the destination node of the data packet to be transmitted into a pre-trained traffic sensing model to obtain a new routing entry outputted by the traffic sensing model, wherein the new routing entry includes at least one intermediate routing node, a source node corresponding to the new routing entry is the source node of the data packet to be transmitted, and a destination node corresponding to the new routing entry is the destination node of the data packet to be transmitted;

storing the new routing entry into the intermediate routing table if a deadlock or a livelock is not formed between a data transmission path corresponding to the new routing entry and a data transmission path corresponding to the routing entry stored in the intermediate routing table; and determining each intermediate routing node included in the new routing entry as the at least one intermediate routing node corresponding to the data packet to be transmitted.

4. The method according to clause 3, wherein the determining the at least one intermediate routing node further includes:

generating a negative incentive if the deadlock or the livelock is formed between the data transmission path corresponding to the new routing entry and the data transmission path corresponding to the routing entry stored in the intermediate routing table; and sending the delay information, the attribute information of the data packet to be transmitted, the identification information of the source node and the destination node of the data packet to be transmitted, and the negative incentive to the server, so that the server trains the traffic sensing model through reinforcement learning (RL).

5. The method according to clause 4, wherein the determining the at least one intermediate routing node further includes:

receiving the delay information sent by each node of the NoC; and sending the delay information to the server, so that the server trains the traffic sensing model through RL.

6. The method according to any of clauses 1 to 5, wherein if the data packet to be transmitted corresponds to one intermediate routing node, then the intermediate routing node is the destination node of the data packet to be transmitted, and the data packet to be transmitted is transmitted from the source node of the data packet to be transmitted to the destination node of the data packet to be transmitted based on the XY routing algorithm; and if the data packet to be transmitted corresponds to n intermediate routing nodes, wherein n is a positive integer greater than or equal to 2, then an $n^{th}$ intermediate routing node of the n intermediate routing nodes is the destination node of the data packet to be transmitted, and the data packet to be transmitted is transmitted from the source node of the data packet to be transmitted to a first intermediate routing node of the n intermediate routing nodes based on the XY routing algorithm, and is transmitted from an ith intermediate routing node of the n intermediate routing nodes to an (i+1)th intermediate routing node of the n intermediate routing nodes based on the XY routing algorithm, wherein i is a positive integer less than n.

7. A data packet transmission method, including:

obtaining a head flit of a data packet to be transmitted, wherein the head flit stores identification information of at least one intermediate routing node, and the at least one intermediate routing node is determined based on a source node and a destination node of the data packet to be transmitted and a data transmission state of each node of an NoC; and transmitting, based on the identification information of each intermediate routing node stored in the head flit, the data packet to be transmitted to the at least one intermediate routing node based on an XY routing algorithm, so that the data packet to be transmitted passes through the at least one intermediate routing node in sequence and then reaches the destination node.

8. The method according to clause 7, wherein obtaining the head flit of a data packet to be transmitted includes:

receiving the identification information of the at least one intermediate routing node from a scheduling management unit and writing the identification information of the at least one intermediate routing node to the head flit of the data packet to be transmitted if a current node is the source node of the data packet to be transmitted; and receiving the head flit of the data packet to be transmitted from an upstream node through the XY routing algorithm if the current node is not the source node of the data packet to be transmitted.

9. The method according to clause 8, wherein writing the identification information of the at least one intermediate routing node to the head flit of the data packet to be transmitted includes:

writing the identification information of the at least one intermediate routing node to the head flit of the data packet to be transmitted in sequence based on a requirement on an order in which the data packet to be transmitted reaches the at least one intermediate routing node, so that the head flit of the data packet to be transmitted stores the identification information of the source node of the data packet to be transmitted and the identification information of the at least one intermediate routing node in sequence; and after receiving the head flit of the data packet to be transmitted from the upstream node through the XY routing algorithm, the method further includes:

parsing the head flit of the data packet to be transmitted to obtain the identification information of the source node of the data packet to be transmitted and the identification information of the at least one intermediate routing node, and determining, based on a sequence in which the identification information of the at least one intermediate routing node is stored, the requirement on the order in which the data packet to be transmitted reaches the intermediate routing nodes.

10. The method according to clause 7, wherein transmitting the data packet to be transmitted to the at least one intermediate routing node based on the XY routing algorithm includes:

determining whether a current node is the intermediate routing node based on the identification information of each intermediate routing node stored in the head flit; and storing a received flit included in the data packet to be transmitted into a buffer if the current node is the intermediate routing node and the current node is not the destination node of the data packet to be transmitted, and transmitting each flit of the data packet to be transmitted stored in the buffer to a next intermediate routing node based on the XY routing algorithm after each flit included in the data packet to be transmitted is stored into the buffer.

11. The method according to clause 10, wherein transmitting the data packet to be transmitted to the at least one intermediate routing node based on the XY routing algorithm includes:

transmitting the received flit included in the data packet to be transmitted to the next intermediate routing node based on the XY routing algorithm if the current node is not the intermediate routing node.

12. The method according to clause 10, further including: adding an invalid identifier to the identification information of the current node stored in the head flit in the buffer if the current node is the intermediate routing node; and transmitting the data packet to be transmitted to the intermediate routing node based on the XY routing algorithm includes:

determining the next identification information without the invalid identifier as destination identification information based on a sequence in which each identification information is stored into the head flit; and transmitting, based on the XY routing algorithm, the data packet to be transmitted to the intermediate routing node identified by the destination identification information.

13. A scheduling management unit, including:

a reading subunit including circuitry configured to determine a source node and a destination node of a data packet to be transmitted;

a planning subunit including circuitry configured to determine at least one intermediate routing node corresponding to the data packet to be transmitted based on the source node and the destination node of the data packet to be transmitted and a data transmission state of each node of an NoC; and an output subunit including circuitry configured to transmit identification information of the at least one intermediate routing node to the source node of the data packet to be transmitted, so that the source node of the data packet to be transmitted writes the identification information of the at least one intermediate routing node to a head flit of the data packet to be transmitted, to enable the data packet to be transmitted to be transmitted to the at least one intermediate routing node in sequence based on an XY routing algorithm and then reach the destination node of the data packet to be transmitted.

14. The scheduling management unit according to clause 13, wherein the planning subunit includes circuitry configured to:

detect whether an intermediate routing table stores at least one available routing entry, a source node corresponding to the available routing entry being the source node of the data packet to be transmitted, a destination node corresponding to the available routing entry being the destination node of the data packet to be transmitted, wherein the available routing entry includes at least one intermediate routing node, and the available routing entry is determined based on the data transmission state of each node of the NoC; and determine, if the intermediate routing table stores the at least one available routing entry, each intermediate routing node included in an available routing entry corresponding to a latest updating time as the at least one intermediate routing node corresponding to the data packet to be transmitted.

15. The scheduling management unit according to clause 14, wherein the planning subunit includes circuitry configured to:

obtain delay information of each node of the NoC if the intermediate routing table does not store the available routing entry, the delay information indicating a delay of each node of the NoC in transmitting the data packet;

input the delay information, attribute information of the data packet to be transmitted, and identification information of the source node and the destination node of the data packet to be transmitted into a pre-trained traffic sensing model to obtain a new routing entry outputted by the traffic sensing model, wherein the new routing entry includes at least one intermediate routing node, a source node corresponding to the new routing entry is the source node of the data packet to be transmitted, and a destination node corresponding to the new routing entry is the destination node of the data packet to be transmitted;

store the new routing entry into the intermediate routing table if a deadlock or a livelock is not formed between a data transmission path corresponding to the new routing entry and a data transmission path corresponding to the routing entry stored in the intermediate routing table; and determine each intermediate routing node included in the new routing entry as the at least one intermediate routing node corresponding to the data packet to be transmitted.

16. The scheduling management unit according to clause 15, wherein the planning subunit includes circuitry configured to:

generate a negative incentive if the deadlock or the livelock is formed between the data transmission path corresponding to the new routing entry and the data transmission path corresponding to the routing entry stored in the intermediate routing table; and send the delay information, the attribute information of the data packet to be transmitted, the identification information of the source node and the destination node of the data packet to be transmitted, and the negative incentive to the server, so that the server trains the traffic sensing model through reinforcement learning (RL).

17. The scheduling management unit according to clause 16, wherein the planning subunit includes circuitry configured to:

receive the delay information sent by each node of the NoC; and send the delay information to the server, so that the server trains the traffic sensing model through RL.

18. The scheduling management unit according to any of clauses 13 to 17, wherein if the data packet to be transmitted corresponds to one intermediate routing node, then the intermediate routing node is the destination node of the data packet to be transmitted, and the data packet to be transmitted is transmitted from the source node of the data packet to be transmitted to the destination node of the data packet to be transmitted based on the XY routing algorithm; and if the data packet to be transmitted corresponds to n intermediate routing nodes, wherein n is a positive integer greater than or equal to 2, then an nth intermediate routing node of the n intermediate routing nodes is the destination node of the data packet to be transmitted, and the data packet to be transmitted is transmitted from the source node of the data packet to be transmitted to a first intermediate routing node of the n intermediate routing nodes based on the XY routing algorithm, and is transmitted from an ith intermediate routing node of the n intermediate routing nodes to an (i+1)th intermediate routing node of the n intermediate routing nodes based on the XY routing algorithm, wherein i is a positive integer less than n.

19. A node of a network on chip (NoC), including:

an obtaining subunit including circuitry configured to obtain a head flit of a data packet to be transmitted, wherein the head flit stores identification information of at least one intermediate routing node, and the at least one intermediate routing node is determined based on a source node and a destination node of the data packet to be transmitted and a data transmission state of each node of the NoC; and a transmission subunit including circuitry configured to transmit, based on the identification information of each intermediate routing node stored in the head flit, the data packet to be transmitted to the intermediate routing node based on an XY routing algorithm, so that the data packet to be transmitted passes through the at least one intermediate routing node in sequence and then reaches the destination node.

20. The node according to clause 19, wherein the obtaining subunit includes circuitry configured to:

receive the identification information of the at least one intermediate routing node from a scheduling management unit and writing the identification information of the at least one intermediate routing node to the head flit of the data packet to be transmitted if a current node is the source node of the data packet to be transmitted; and receive the head flit of the data packet to be transmitted from an upstream node through the XY routing algorithm if the current node is not the source node of the data packet to be transmitted.

21. The node according to clause 20, wherein the obtaining subunit includes circuitry configured to:

write the identification information of the at least one intermediate routing node to the head flit of the data packet to be transmitted in sequence based on a requirement on an order in which the data packet to be transmitted reaches the at least one intermediate routing node, so that the head flit of the data packet to be transmitted stores the identification information of the source node of the data packet to be transmitted and the identification information of the at least one intermediate routing node in sequence;

parse the head flit of the data packet to be transmitted to obtain the identification information of the source node of the data packet to be transmitted and the identification information of the at least one intermediate routing node; and determine, based on a sequence in which the identification information of the at least one intermediate routing node is stored, the requirement on the order in which the data packet to be transmitted reaches the intermediate routing nodes.

22. The node according to clause 19, wherein the transmission subunit includes circuitry configured to:

determine whether a current node is the intermediate routing node based on the identification information of each intermediate routing node stored in the head flit; and store a received flit included in the data packet to be transmitted into a buffer if the current node is the intermediate routing node and the current node is not the destination node of the data packet to be transmitted, and transmit each flit of the data packet to be transmitted stored in the buffer to a next intermediate routing node based on the XY routing algorithm after each flit included in the data packet to be transmitted is stored into the buffer.

23. The node according to clause 22, wherein the transmission subunit includes circuitry configured to:

transmit the received flit included in the data packet to be transmitted to the next intermediate routing node based on the XY routing algorithm if the current node is not the intermediate routing node.

24. The node according to clause 22, the transmission subunit includes circuitry configured to:

add an invalid identifier to the identification information of the current node stored in the head flit in the buffer if the current node is the intermediate routing node;

determine the next identification information without the invalid identifier as destination identification information based on a sequence in which each identification information is stored into the head flit; and transmit, based on the XY routing algorithm, the data packet to be transmitted to the intermediate routing node identified by the destination identification information.

25. A scheduling management unit, including:

a memory storing instructions; and one or more processors configured to execute the instructions to cause the scheduling management unit to perform operations including:

determining a source node and a destination node of a data packet to be transmitted;

determining at least one intermediate routing node corresponding to the data packet to be transmitted based on the source node and the destination node of the data packet to be transmitted and a data transmission state of each node in a network on chip (NoC); and transmitting identification information of the at least one intermediate routing node to the source node of the data packet to be transmitted, so that the source node of the data packet to be transmitted writes the identification information of the at least one intermediate routing node to a head flit of the data packet to be transmitted, to enable the data packet to be transmitted to be transmitted to the at least one intermediate routing node in sequence based on an XY routing algorithm and then reach the destination node of the data packet to be transmitted.

26. The scheduling management unit according to clause 25, wherein the determining the at least one intermediate routing node includes:

detecting whether an intermediate routing table stores at least one available routing entry, a source node corresponding to the available routing entry being the source node of the data packet to be transmitted, a destination node corresponding to the available routing entry being the destination node of the data packet to be transmitted, wherein the available routing entry includes at least one intermediate routing node, and the available routing entry is determined based on the data transmission state of each node of the NoC; and determining, if the intermediate routing table stores the at least one available routing entry, each intermediate routing node included in an available routing entry corresponding to a latest updating time as the at least one intermediate routing node corresponding to the data packet to be transmitted.

27. The scheduling management unit according to clause 26, wherein the determining the at least one intermediate routing node further includes:

obtaining delay information of each node of the NoC if the intermediate routing table does not store the available routing entry, the delay information indicating a delay of each node of the NoC in transmitting the data packet;

inputting the delay information, attribute information of the data packet to be transmitted, and identification information of the source node and the destination node of the data packet to be transmitted into a pre-trained traffic sensing model to obtain a new routing entry outputted by the traffic sensing model, wherein the new routing entry includes at least one intermediate routing node, a source node corresponding to the new routing entry is the source node of the data packet to be transmitted, and a destination node corresponding to the new routing entry is the destination node of the data packet to be transmitted;

storing the new routing entry into the intermediate routing table if a deadlock or a livelock is not formed between a data transmission path corresponding to the new routing entry and a data transmission path corresponding to the routing entry stored in the intermediate routing table; and determining each intermediate routing node included in the new routing entry as the at least one intermediate routing node corresponding to the data packet to be transmitted.

28. The scheduling management unit according to clause 27, wherein the determining the at least one intermediate routing node further includes:

generating a negative incentive if the deadlock or the livelock is formed between the data transmission path corresponding to the new routing entry and the data transmission path corresponding to the routing entry stored in the intermediate routing table; and sending the delay information, the attribute information of the data packet to be transmitted, the identification information of the source node and the destination node of the data packet to be transmitted, and the negative incentive to the server, so that the server trains the traffic sensing model through reinforcement learning (RL).

29. The scheduling management unit according to clause 28, wherein the determining the at least one intermediate routing node further includes:

receiving the delay information sent by each node of the NoC; and sending the delay information to the server, so that the server trains the traffic sensing model through RL.

30. The scheduling management unit according to any of clauses 25 to 29, wherein if the data packet to be transmitted corresponds to one intermediate routing node, then the intermediate routing node is the destination node of the data packet to be transmitted, and the data packet to be transmitted is transmitted from the source node of the data packet to be transmitted to the destination node of the data packet to be transmitted based on the XY routing algorithm; and if the data packet to be transmitted corresponds to n intermediate routing nodes, wherein n is a positive integer greater than or equal to 2, then an nth intermediate routing node of the n intermediate routing nodes is the destination node of the data packet to be transmitted, and the data packet to be transmitted is transmitted from the source node of the data packet to be transmitted to a first intermediate routing node of the n intermediate routing nodes based on the XY routing algorithm, and is transmitted from an ith intermediate routing node of the n intermediate routing nodes to an (i+1)th intermediate routing node of the n intermediate routing nodes based on the XY routing algorithm, wherein i is a positive integer less than n.

31. A node of a network on chip (NoC), including:

a memory storing instructions; and one or more processors configured to execute the instructions to cause the node to perform operations including:

obtaining a head flit of a data packet to be transmitted, wherein the head flit stores identification information of at least one intermediate routing node, and the at least one intermediate routing node is determined based on a source node and a destination node of the data packet to be transmitted and a data transmission state of each node of an NoC; and transmitting, based on the identification information of each intermediate routing node stored in the head flit, the data packet to be transmitted to the at least one intermediate routing node based on an XY routing algorithm, so that the data packet to be transmitted passes through the at least one intermediate routing node in sequence and then reaches the destination node.

32. The node according to clause 31, wherein obtaining the head flit of a data packet to be transmitted includes:

receiving the identification information of the at least one intermediate routing node from a scheduling management unit and writing the identification information of the at least one intermediate routing node to the head flit of the data packet to be transmitted if a current node is the source node of the data packet to be transmitted; and receiving the head flit of the data packet to be transmitted from an upstream node through the XY routing algorithm if the current node is not the source node of the data packet to be transmitted.

33. The node according to clause 32, wherein writing the identification information of the at least one intermediate routing node to the head flit of the data packet to be transmitted includes:

writing the identification information of the at least one intermediate routing node to the head flit of the data packet to be transmitted in sequence based on a requirement on an order in which the data packet to be transmitted reaches the at least one intermediate routing node, so that the head flit of the data packet to be transmitted stores the identification information of the source node of the data packet to be transmitted and the identification information of the at least one intermediate routing node in sequence; and after receiving the head flit of the data packet to be transmitted from the upstream node through the XY routing algorithm, the method further includes:

parsing the head flit of the data packet to be transmitted to obtain the identification information of the source node of the data packet to be transmitted and the identification information of the at least one intermediate routing node, and determining, based on a sequence in which the identification information of the at least one intermediate routing node is stored, the requirement on the order in which the data packet to be transmitted reaches the intermediate routing nodes.

34. The node according to clause 31, wherein transmitting the data packet to be transmitted to the at least one intermediate routing node based on the XY routing algorithm includes:

determining whether a current node is the intermediate routing node based on the identification information of each intermediate routing node stored in the head flit; and storing a received flit included in the data packet to be transmitted into a buffer if the current node is the intermediate routing node and the current node is not the destination node of the data packet to be transmitted, and transmitting each flit of the data packet to be transmitted stored in the buffer to a next intermediate routing node based on the XY routing algorithm after each flit included in the data packet to be transmitted is stored into the buffer.

35. The node according to clause 34, wherein transmitting the data packet to be transmitted to the at least one intermediate routing node based on the XY routing algorithm includes:

transmitting the received flit included in the data packet to be transmitted to the next intermediate routing node based on the XY routing algorithm if the current node is not the intermediate routing node.

36. The node according to clause 34, further including: adding an invalid identifier to the identification information of the current node stored in the head flit in the buffer if the current node is the intermediate routing node; and transmitting the data packet to be transmitted to the intermediate routing node based on the XY routing algorithm includes:

determining the next identification information without the invalid identifier as destination identification information based on a sequence in which each identification information is stored into the head flit; and transmitting, based on the XY routing algorithm, the data packet to be transmitted to the intermediate routing node identified by the destination identification information.

37. A chip, including:

the scheduling management unit according to any of clauses 13 to 18 and clauses 25 to 30; and a plurality of nodes of an NoC according to any of clauses 19 to 24 and clauses 31 to 36.

38. A graphic card, including the chip according to clause 37.

39. A non-transitory computer-readable storage medium, storing a set of instructions that are executable by one or more processors of a device to cause the device to perform the data packet transmission method according to any of the clauses 1-12.

It is to be noted that, the terms such as “first” and “second” in the specification and claims of this disclosure and the above accompanying drawings are used for distinguishing similar objects but not necessarily used for describing particular order or sequence. It is to be understood that such used data is interchangeable where appropriate so that the examples of this disclosure described here can be implemented in an order other than those illustrated or described here. Moreover, the terms “include”, “have” and any other variants thereof mean to cover the non-exclusive inclusion. For example, a process, method, system, product, or device that includes a list of steps or units is not necessarily limited to those expressly listed steps or units, but may include other steps or units not expressly listed or inherent to such a process, method, system, product, or device.

As used herein, unless specifically stated otherwise, the term “or” encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the disclosure disclosed herein. It is intended that the specification and examples be considered as exemplary only, with a true scope and spirit of the disclosure being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It is to be understood that the disclosed technical content may be implemented in other ways. The apparatus embodiments described above are only schematic. For example, the division of the units is only a logical function division. In actual implementations, there may be another division manner. For example, multiple units or components may be combined or integrated into another system, or some features can be ignored or not implemented. In addition, the displayed or discussed mutual coupling or direct coupling or communication connection may be indirect coupling or communication connection through some interfaces, units, or modules, which may be in electrical or other forms.

The units described as separate components may or may not be physically separated, and the components displayed as units may or may not be physical units, that is, they may be located in one place or may be distributed to a plurality of network units. Part of or all the units may be selected according to actual needs to achieve the purpose of the solution described in some embodiments of the present disclosure.

In addition, the functional units in various embodiments of the present disclosure may be integrated into one processing unit, or each unit may exist alone physically, or two or more units may be integrated into one unit. The integrated units described above may be implemented either in the form of hardware or in the form of a software functional unit.

If the integrated units are implemented in the form of a software functional unit and sold or used as an independent product, they may be stored in a quantum computer-readable storage medium. Based on such an understanding, the technical solutions of the present disclosure essentially, or the part making contributions to the prior art, or all or part of the technical solutions may be embodied in the form of a software product. The quantum computer software product is stored in a storage medium and includes several instructions used for causing a quantum computer device to execute all or part of steps of the methods in various embodiments of the present disclosure.

The foregoing descriptions are merely preferred implementations of the present disclosure. It is to be noted that a plurality of improvements and refinements may be made by those of ordinary skill in the technical field without departing from the principle of the present disclosure, and shall fall within the scope of protection of the present disclosure.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A data packet transmission method, comprising:

determining a source node and a destination node of a data packet to be transmitted;

determining at least one intermediate routing node corresponding to the data packet to be transmitted based on the source node and the destination node of the data packet to be transmitted and a data transmission state of each node in a network on chip (NoC); and transmitting identification information of the at least one intermediate routing node to the source node of the data packet to be transmitted, so that the source node of the data packet to be transmitted writes the identification information of the at least one intermediate routing node to a head flit of the data packet to be transmitted, to enable the data packet to be transmitted to be transmitted to the at least one intermediate routing node in sequence based on an XY routing algorithm and then reach the destination node of the data packet to be transmitted, wherein the determining the at least one intermediate routing node further comprises:

determining the at least one intermediate routing node corresponding to the data packet to be transmitted according to an available routing entry stored in an intermediate routing table, a source node corresponding to the available routing entry being the source node of the data packet to be transmitted, a destination node corresponding to the available routing entry being the destination node of the data packet to be transmitted, wherein the available routing entry comprises at least one intermediate routing node, and the available routing entry is determined based on the data transmission state of each node of the NoC; and obtaining a new routing entry, by a pre-trained traffic sensing model, according to delay information of each node of the NoC, attribute information of the data packet to be transmitted, identification information of the source node and the destination node of the data packet to be transmitted, wherein the delay information indicating a delay of each node of the NoC in transmitting the data packet; wherein the new routing entry comprises at least one intermediate routing node, a source node corresponding to the new routing entry is the source node of the data packet to be transmitted, and a destination node corresponding to the new routing entry is the destination node of the data packet to be transmitted.

2. The method according to claim 1, wherein the determining the at least one intermediate routing node comprises:

detecting whether the intermediate routing table stores at least one available routing entry; and determining, if the intermediate routing table stores the at least one available routing entry, each intermediate routing node comprised in an available routing entry corresponding to a latest updating time as the at least one intermediate routing node corresponding to the data packet to be transmitted.

3. The method according to claim 2, wherein the determining the at least one intermediate routing node further comprises:

obtaining the delay information of each node of the NoC if the intermediate routing table does not store the available routing entry;

inputting the delay information, attribute information of the data packet to be transmitted, and identification information of the source node and the destination node of the data packet to be transmitted into the pre-trained traffic sensing model to obtain the new routing entry outputted by the traffic sensing model;

storing the new routing entry into the intermediate routing table if a deadlock or a livelock is not formed between a data transmission path corresponding to the new routing entry and a data transmission path corresponding to the routing entry stored in the intermediate routing table; and determining each intermediate routing node comprised in the new routing entry as the at least one intermediate routing node corresponding to the data packet to be transmitted.

4. The method according to claim 3, wherein the determining the at least one intermediate routing node further comprises:

generating a negative incentive if the deadlock or the livelock is formed between the data transmission path corresponding to the new routing entry and the data transmission path corresponding to the routing entry stored in the intermediate routing table; and sending the delay information, the attribute information of the data packet to be transmitted, the identification information of the source node and the destination node of the data packet to be transmitted, and the negative incentive to a server, so that the server trains the traffic sensing model through reinforcement learning (RL).

5. The method according to claim 4, wherein the determining the at least one intermediate routing node further comprises:

receiving the delay information sent by each node of the NoC; and sending the delay information to the server, so that the server trains the traffic sensing model through RL.

6. The method according to claim 1, wherein if the data packet to be transmitted corresponds to one intermediate routing node, then the intermediate routing node is the destination node of the data packet to be transmitted, and the data packet to be transmitted is transmitted from the source node of the data packet to be transmitted to the destination node of the data packet to be transmitted based on the XY routing algorithm; or if the data packet to be transmitted corresponds to n intermediate routing nodes, wherein n is a positive integer greater than or equal to 2, then an $n^{th}$ intermediate routing node of the n intermediate routing nodes is the destination node of the data packet to be transmitted, and the data packet to be transmitted is transmitted from the source node of the data packet to be transmitted to a first intermediate routing node of the n intermediate routing nodes based on the XY routing algorithm, and is transmitted from an ith intermediate routing node of the n intermediate routing nodes to an $(i+1)^{th}$ intermediate routing node of the n intermediate routing nodes based on the XY routing algorithm, wherein i is a positive integer less than n.

7. A scheduling management unit, comprising:

a reading subunit comprising circuitry configured to determine a source node and a destination node of a data packet to be transmitted;

a planning subunit comprising circuitry configured to determine at least one intermediate routing node corresponding to the data packet to be transmitted based on the source node and the destination node of the data packet to be transmitted and a data transmission state of each node of an NoC; and an output subunit comprising circuitry configured to transmit identification information of the at least one intermediate routing node to the source node of the data packet to be transmitted, so that the source node of the data packet to be transmitted writes the identification information of the at least one intermediate routing node to a head flit of the data packet to be transmitted, to enable the data packet to be transmitted to be transmitted to the at least one intermediate routing node in sequence based on an XY routing algorithm and then reach the destination node of the data packet to be transmitted, wherein the planning subunit comprises circuitry further configured to determine the at least one intermediate routing node corresponding to the data packet to be transmitted according to an available routing entry stored in an intermediate routing table, and obtain a new routing entry, by a pre-trained traffic sensing model, according to delay information of each node of the NoC, attribute information of the data packet to be transmitted, identification information of the source node and the destination node of the data packet to be transmitted, wherein a source node corresponding to the available routing entry is the source node of the data packet to be transmitted, a destination node corresponding to the available routing entry is the destination node of the data packet to be transmitted, the available routing entry comprises at least one intermediate routing node, and the available routing entry is determined based on the data transmission state of each node of the NoC, wherein the delay information indicating a delay of each node of the NoC in transmitting the data packet;

wherein the new routing entry comprises at least one intermediate routing node, a source node corresponding to the new routing entry is the source node of the data packet to be transmitted, and a destination node corresponding to the new routing entry is the destination node of the data packet to be transmitted.

8. The scheduling management unit according to claim 7, wherein the planning subunit comprises circuitry configured to:

detect whether the intermediate routing table stores at least one available routing entry; and determine, if the intermediate routing table stores the at least one available routing entry, each intermediate routing node comprised in an available routing entry corresponding to a latest updating time as the at least one intermediate routing node corresponding to the data packet to be transmitted.

9. The scheduling management unit according to claim 8, wherein the planning subunit comprises circuitry configured to:

obtain the delay information of each node of the NOC if the intermediate routing table does not store the available routing entry;

input the delay information, attribute information of the data packet to be transmitted, and identification information of the source node and the destination node of the data packet to be transmitted into the pre-trained traffic sensing model to obtain the new routing entry outputted by the traffic sensing model;

store the new routing entry into the intermediate routing table if a deadlock or a livelock is not formed between a data transmission path corresponding to the new routing entry and a data transmission path corresponding to the routing entry stored in the intermediate routing table; and determine each intermediate routing node comprised in the new routing entry as the at least one intermediate routing node corresponding to the data packet to be transmitted.

10. The scheduling management unit according to claim 9, wherein the planning subunit comprises circuitry configured to:

generate a negative incentive if the deadlock or the livelock is formed between the data transmission path corresponding to the new routing entry and the data transmission path corresponding to the routing entry stored in the intermediate routing table; and send the delay information, the attribute information of the data packet to be transmitted, the identification information of the source node and the destination node of the data packet to be transmitted, and the negative incentive to a server, so that the server trains the traffic sensing model through reinforcement learning (RL).

11. The scheduling management unit according to claim 10, wherein the planning subunit comprises circuitry configured to:

receive the delay information sent by each node of the NoC; and send the delay information to the server, so that the server trains the traffic sensing model through RL.

12. The scheduling management unit according to claim 7, wherein if the data packet to be transmitted corresponds to one intermediate routing node, then the intermediate routing node is the destination node of the data packet to be transmitted, and the data packet to be transmitted is transmitted from the source node of the data packet to be transmitted to the destination node of the data packet to be transmitted based on the XY routing algorithm; and if the data packet to be transmitted corresponds to n intermediate routing nodes, wherein n is a positive integer greater than or equal to 2, then an nth intermediate routing node of the n intermediate routing nodes is the destination node of the data packet to be transmitted, and the data packet to be transmitted is transmitted from the source node of the data packet to be transmitted to a first intermediate routing node of the n intermediate routing nodes based on the XY routing algorithm, and is transmitted from an ith intermediate routing node of the n intermediate routing nodes to an (i+1)th intermediate routing node of the n intermediate routing nodes based on the XY routing algorithm, wherein i is a positive integer less than n.

13. A scheduling management unit, comprising:

a memory storing instructions; and one or more processors configured to execute the instructions to cause the scheduling management unit to perform operations comprising:

determining a source node and a destination node of a data packet to be transmitted;

determining at least one intermediate routing node corresponding to the data packet to be transmitted based on the source node and the destination node of the data packet to be transmitted and a data transmission state of each node in a network on chip (NoC); and transmitting identification information of the at least one intermediate routing node to the source node of the data packet to be transmitted, so that the source node of the data packet to be transmitted writes the identification information of the at least one intermediate routing node to a head flit of the data packet to be transmitted, to enable the data packet to be transmitted to be transmitted to the at least one intermediate routing node in sequence based on an XY routing algorithm and then reach the destination node of the data packet to be transmitted, wherein the determining the at least one intermediate routing node further comprises:

determining the at least one intermediate routing node corresponding to the data packet to be transmitted according to an available routing entry stored in an intermediate routing table, a source node corresponding to the available routing entry being the source node of the data packet to be transmitted, a destination node corresponding to the available routing entry being the destination node of the data packet to be transmitted, wherein the available routing entry comprises at least one intermediate routing node, and the available routing entry is determined based on the data transmission state of each node of the NoC; and obtaining a new routing entry, by a pre-trained traffic sensing model, according to delay information of each node of the NoC, attribute information of the data packet to be transmitted, identification information of the source node and the destination node of the data packet to be transmitted, wherein the delay information indicating a delay of each node of the NoC in transmitting the data packet; wherein the new routing entry comprises at least one intermediate routing node, a source node corresponding to the new routing entry is the source node of the data packet to be transmitted, and a destination node corresponding to the new routing entry is the destination node of the data packet to be transmitted.

14. The scheduling management unit according to claim 13, wherein the determining the at least one intermediate routing node comprises:

detecting whether the intermediate routing table stores at least one available routing entry; and determining, if the intermediate routing table stores the at least one available routing entry, each intermediate routing node comprised in an available routing entry corresponding to a latest updating time as the at least one intermediate routing node corresponding to the data packet to be transmitted.

15. The scheduling management unit according to claim 14, wherein the determining the at least one intermediate routing node further comprises:

obtaining the delay information of each node of the NoC if the intermediate routing table does not store the available routing entry;

inputting the delay information, attribute information of the data packet to be transmitted, and identification information of the source node and the destination node of the data packet to be transmitted into the pre-trained traffic sensing model to obtain the new routing entry outputted by the traffic sensing model;

storing the new routing entry into the intermediate routing table if a deadlock or a livelock is not formed between a data transmission path corresponding to the new routing entry and a data transmission path corresponding to the routing entry stored in the intermediate routing table; and determining each intermediate routing node comprised in the new routing entry as the at least one intermediate routing node corresponding to the data packet to be transmitted.

16. The scheduling management unit according to claim 15, wherein the determining the at least one intermediate routing node further comprises:

generating a negative incentive if the deadlock or the livelock is formed between the data transmission path corresponding to the new routing entry and the data transmission path corresponding to the routing entry stored in the intermediate routing table; and sending the delay information, the attribute information of the data packet to be transmitted, the identification information of the source node and the destination node of the data packet to be transmitted, and the negative incentive to a server, so that the server trains the traffic sensing model through reinforcement learning (RL).

17. The scheduling management unit according to claim 16, wherein the determining the at least one intermediate routing node further comprises:

receiving the delay information sent by each node of the NoC; and sending the delay information to the server, so that the server trains the traffic sensing model through RL.

18. The scheduling management unit according to claim 13, wherein if the data packet to be transmitted corresponds to one intermediate routing node, then the intermediate routing node is the destination node of the data packet to be transmitted, and the data packet to be transmitted is transmitted from the source node of the data packet to be transmitted to the destination node of the data packet to be transmitted based on the XY routing algorithm; and if the data packet to be transmitted corresponds to n intermediate routing nodes, wherein n is a positive integer greater than or equal to 2, then an nth intermediate routing node of the n intermediate routing nodes is the destination node of the data packet to be transmitted, and the data packet to be transmitted is transmitted from the source node of the data packet to be transmitted to a first intermediate routing node of the n intermediate routing nodes based on the XY routing algorithm, and is transmitted from an ith intermediate routing node of the n intermediate routing nodes to an (i+1)th intermediate routing node of the n intermediate routing nodes based on the XY routing algorithm, wherein i is a positive integer less than n.

* * * * *